(12) United States Patent
Cloud et al.

(10) Patent No.: US 10,828,822 B2
(45) Date of Patent: Nov. 10, 2020

(54) METHOD FOR FABRICATING THERMOPLASTIC SANDWICH STRUCTURAL PANEL USING THERMOFORMING AND COMPRESSION MOLDING

(71) Applicant: THE BOEING COMPANY, Chicago, IL (US)

(72) Inventors: Michael J. Cloud, Snohomish, WA (US); Jason Turner, Marysville, WA (US); Joseph D. Walters, Everett, WA (US)

(73) Assignee: THE BOEING COMPANY, Chicago, IL (US)

( * ) Notice: Subject to any disclaimer, the term of this patent is extended or adjusted under 35 U.S.C. 154(b) by 276 days.

(21) Appl. No.: 15/892,920

(22) Filed: Feb. 9, 2018

(65) Prior Publication Data
US 2018/0162039 A1 Jun. 14, 2018

Related U.S. Application Data

(63) Continuation-in-part of application No. 15/228,152, filed on Aug. 4, 2016, now Pat. No. 10,207,434.

(51) Int. Cl.
*B29C 51/36* (2006.01)
*B29C 70/44* (2006.01)
(Continued)

(52) U.S. Cl.
CPC ............ *B29C 51/36* (2013.01); *B29C 43/183* (2013.01); *B29C 51/105* (2013.01);
(Continued)

(58) Field of Classification Search
None
See application file for complete search history.

(56) References Cited

U.S. PATENT DOCUMENTS

| | | |
|---|---|---|
| 7,204,949 B2 | 4/2007 | Watanabe et al. |
| 7,758,786 B2 | 7/2010 | Nemchick et al. |
| 2003/0030188 A1 | 2/2003 | Spengler |

FOREIGN PATENT DOCUMENTS

WO   WO-2015065413 A1   5/2015

OTHER PUBLICATIONS

Wood, "In-Mold Alternatives to Postmold Decoration", Composite World Article, May 17, 2016.
(Continued)

*Primary Examiner* — Monica A Huson
(74) *Attorney, Agent, or Firm* — Marshall, Gerstein & Borun LLP

(57) ABSTRACT

A method for making a structural sandwich panel includes the steps of positioning a first and second thermoplastic skin elements in overlying relationship with respect to a heated male and heated female die molds respectively. A first pressure reduction is applied between the first thermoplastic skin element and the heated male die mold and a second pressure reduction is applied between the second thermoplastic and the heated female die mold. A core panel element is positioned between the heated male die mold and the heated female die mold wherein the core panel element has a first adhesive on a first side and has a second adhesive on a second opposing side. The male and female die molds are closed and exert a pressure onto the core panel element to secure the first and second thermoplastic skin elements to the core panel element and form the core panel element.

20 Claims, 20 Drawing Sheets

(51) Int. Cl.
*B29C 70/46* (2006.01)
*B29C 51/10* (2006.01)
*B29D 99/00* (2010.01)
*B29C 43/18* (2006.01)
*B29C 70/08* (2006.01)
B29K 105/08 (2006.01)
B29L 9/00 (2006.01)
B29L 31/00 (2006.01)
B29C 51/26 (2006.01)
B29C 51/42 (2006.01)
B29C 51/38 (2006.01)
B29C 51/00 (2006.01)

(52) U.S. Cl.
CPC .......... *B29C 70/086* (2013.01); *B29C 70/443* (2013.01); *B29C 70/465* (2013.01); *B29D 99/0021* (2013.01); *B29C 51/006* (2013.01); *B29C 51/262* (2013.01); *B29C 51/38* (2013.01); *B29C 51/428* (2013.01); *B29K 2105/0872* (2013.01); *B29L 2009/00* (2013.01); *B29L 2031/722* (2013.01)

(56) References Cited

OTHER PUBLICATIONS

Non-Final Office Action for U.S. Appl. No. 15/228,152 dated Jun. 15, 2018.

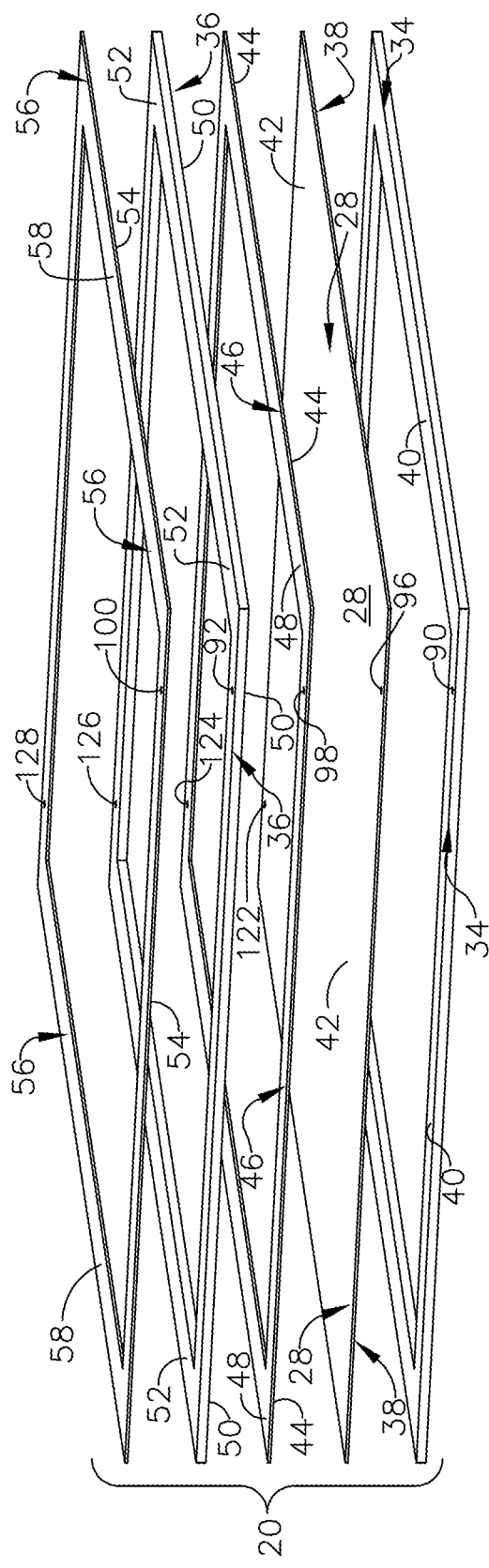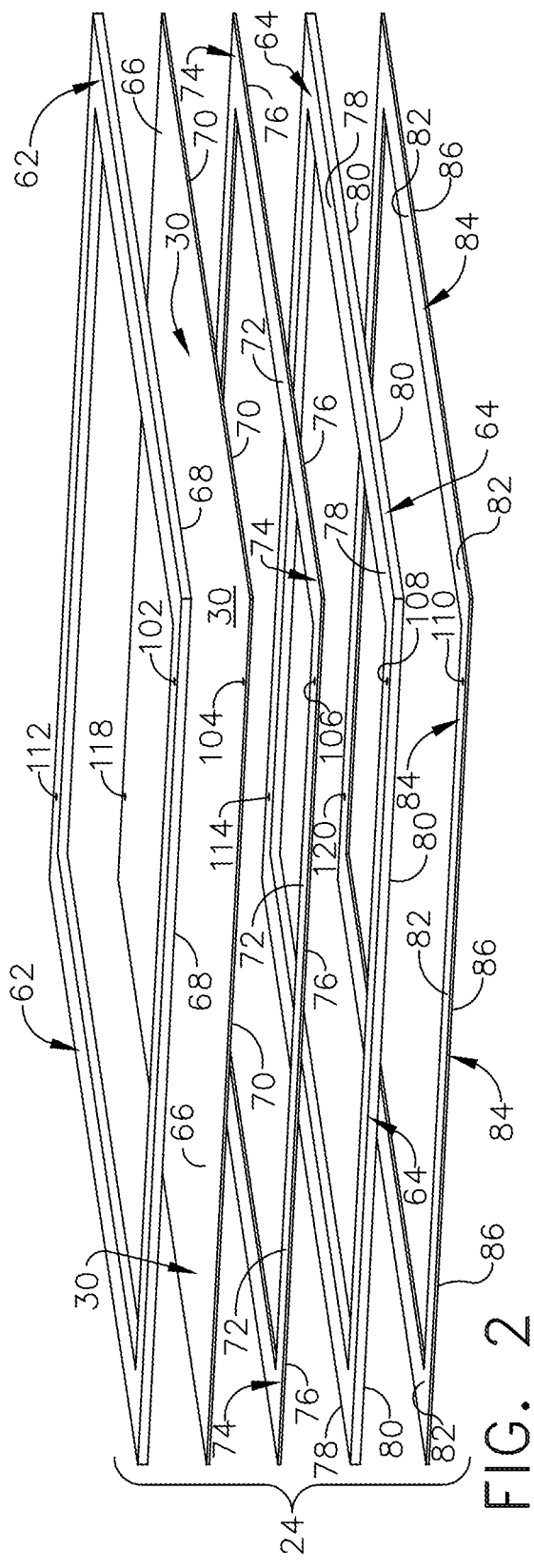
FIG. 2

METHOD FOR FABRICATING THERMOPLASTIC SANDWICH STRUCTURAL PANEL USING THERMOFORMING AND COMPRESSION MOLDING

CROSS-REFERENCE TO RELATED APPLICATION

This application is a continuation in part of pending U.S. patent application Ser. No. 15/228,152 (filed Aug. 4, 2016). The entirety of this application is incorporated by reference herein.

FIELD

This disclosure is related to constructing structural panels and more particularly to structural sandwich panels.

BACKGROUND

Fabrication of structural panels such as sandwich panels have been constructed in a matched die mold process utilizing phenolic prepreg face sheets with a honeycomb core in what can be a time-consuming process. The resulting panel structure further requires a surface preparation and a secondary decorative application process which adds additional processing time to the final fabrication of the sandwich panel. Additionally the process requires the manufacturing of a decorative laminate, which is costly due to raw material, tooling, equipment and labor costs.

There is a need to reduce the time, labor, equipment, tooling, floor space for manufacturing and costs associated with the fabrication of a structural sandwich panel with a matched die mold and the fabricating the structural sandwich panel with having at least one decorative surface.

SUMMARY

An example includes a method for making a structural sandwich panel which includes the steps of positioning a first thermoplastic skin element in overlying relationship with respect to a heated male die mold of a matched die mold apparatus and applying a first pressure reduction between the first thermoplastic skin element and the heated male die mold forming the first thermoplastic skin element to a shape of the male die mold. The method further includes positioning a second thermoplastic skin element in overlying relationship with respect to a heated female die mold of the matched die mold apparatus and applying a second pressure reduction between the second thermoplastic skin element and the female die mold forming the second thermoplastic skin element to a shape of the heated female die mold. Positioning a core panel element between the male die mold and the female die mold wherein a first adhesive is positioned on a first side of the core panel element and a second adhesive is positioned on a second opposing side of the core panel element with the first side of the core panel element facing the first thermoplastic skin element and the second opposing side of the core panel element facing the second thermoplastic skin element. The method further includes closing the male and female die molds exerting a pressure onto the core panel element securing the first and second thermoplastic skin elements to the core panel element and further forming the first side of the core panel element to the shape corresponding to a shape of the male die mold and forming the second opposing side of the core panel element to a shape corresponding to the shape of the female die mold.

The features, functions, and advantages that have been discussed can be achieved independently in various embodiments or may be combined in yet other embodiments further details of which can be seen with reference to the following description and drawings.

BRIEF SUMMARY OF THE DRAWINGS

FIG. 2 is an exploded view of the two frames, as seen in FIG. 1, including a film layer positioned within each of the two frames;

DESCRIPTION

An improved compressive matched die mold apparatus and a method of making a contour composite panel with this apparatus will provide a single process for the fabrication of a contour composite panel having at least one side of the panel having a decorative film layer positioned thereon. The decorative film layer will be applied on at least one side of composite layup used in fabricating a cured composite panel at the same time the composite layup is provided a contour configuration with the compressive matched die mold. This improved apparatus and method described herein will reduce costly scrapping of panels that have a wrinkled decorative surface. Moreover, the apparatus and method will provide great cost savings with the application of the decorative film layer to the composite layup occurring in the same process of imparting contour to the composite layup. Application of compressive force and heat results in curing the composite layup into a finished composite panel with a decorative film adhered to the finished composite panel.

Figure 1:
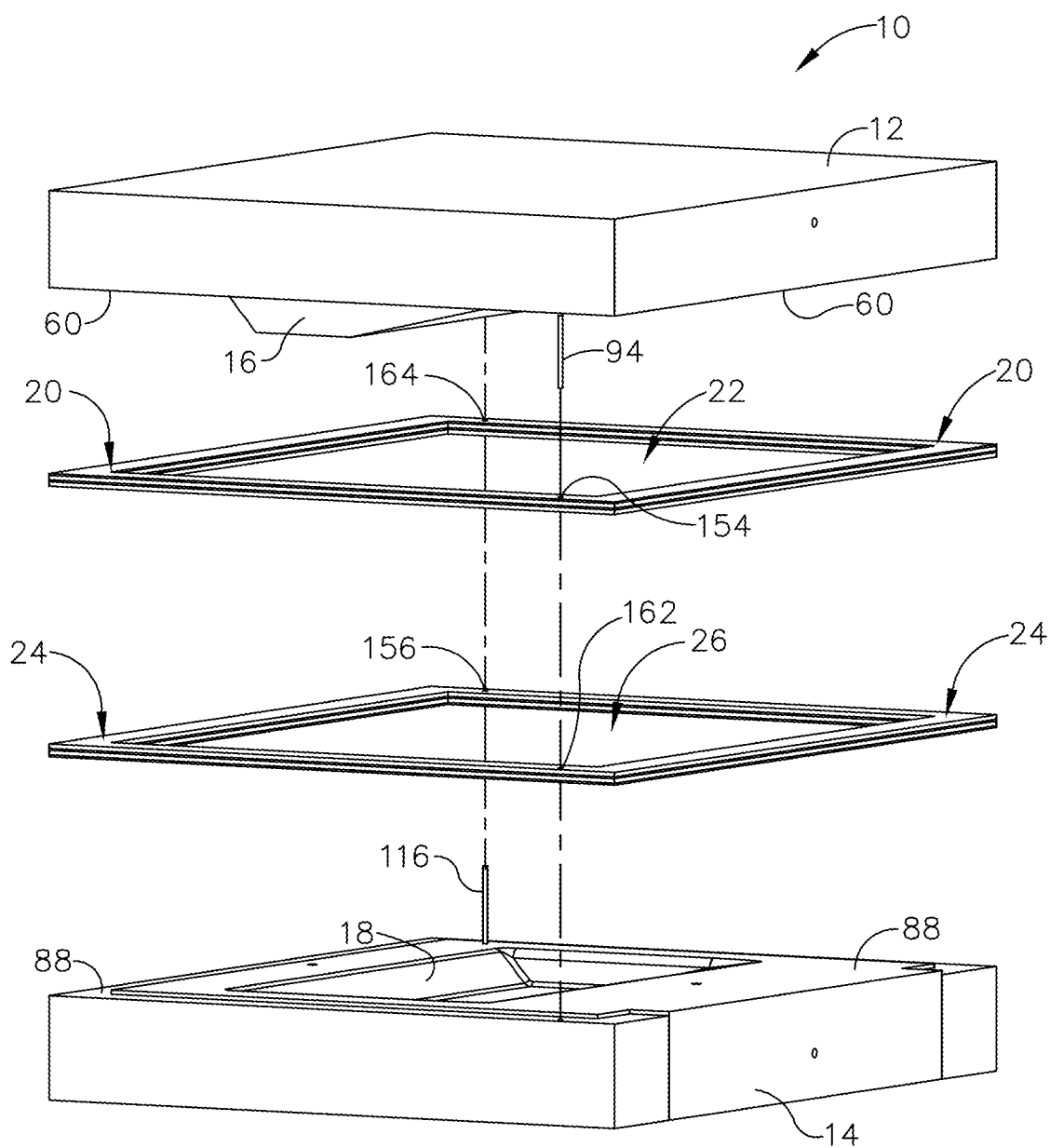
FIG. 1 is an exploded perspective view of a match mold which includes a male die mold and a female die mold and in this embodiment two frames are positioned between the male and female die molds.

In referring to FIG. 1 matched die mold 10 is shown having male die mold 12 and female die mold 14. In this example, male die mold 12 is positioned directly over female die mold 14. However, in other embodiments, male die mold 12 and female die mold 14 are positioned in other orientations relative to one another. Male die mold 12 defines first contoured surface 16 and female die mold 14 defines second contoured surface 18. In this embodiment, compressive matched die mold 10 will impart a contoured surface on opposing sides of a composite panel to be formed within matched die mold 10 and at the same time apply a decorative film onto one or both of opposing sides of the composite panel. The additional application of heat will provide for a cured composite panel with a decorative film positioned on one or both of opposing sides.

Figure 3:
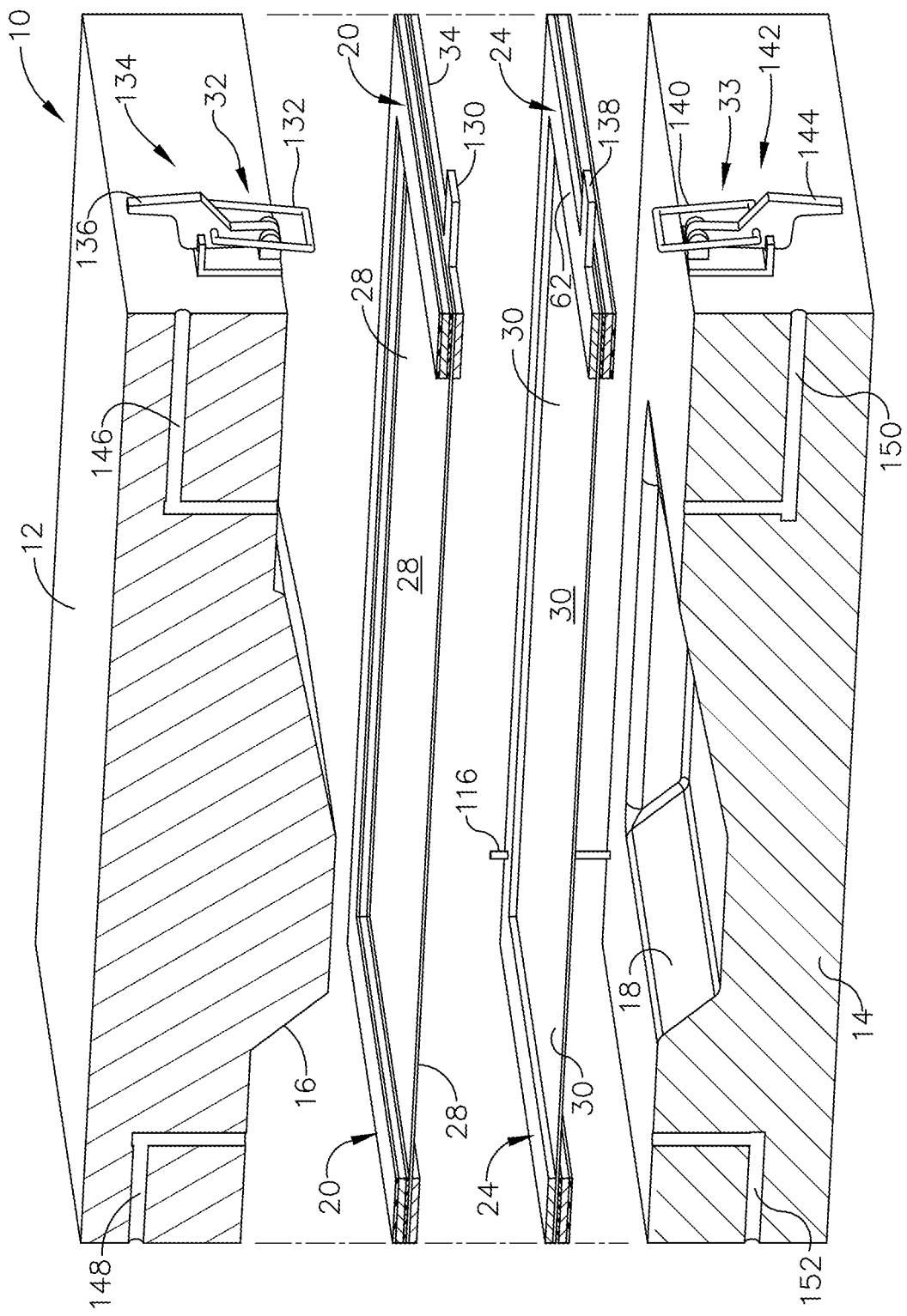
FIG. 3 is a cross section exploded perspective view of the match mold of FIG. 1 with the two frames each having a film layer extending across an opening defined by each of the two frames.
Figure 4:
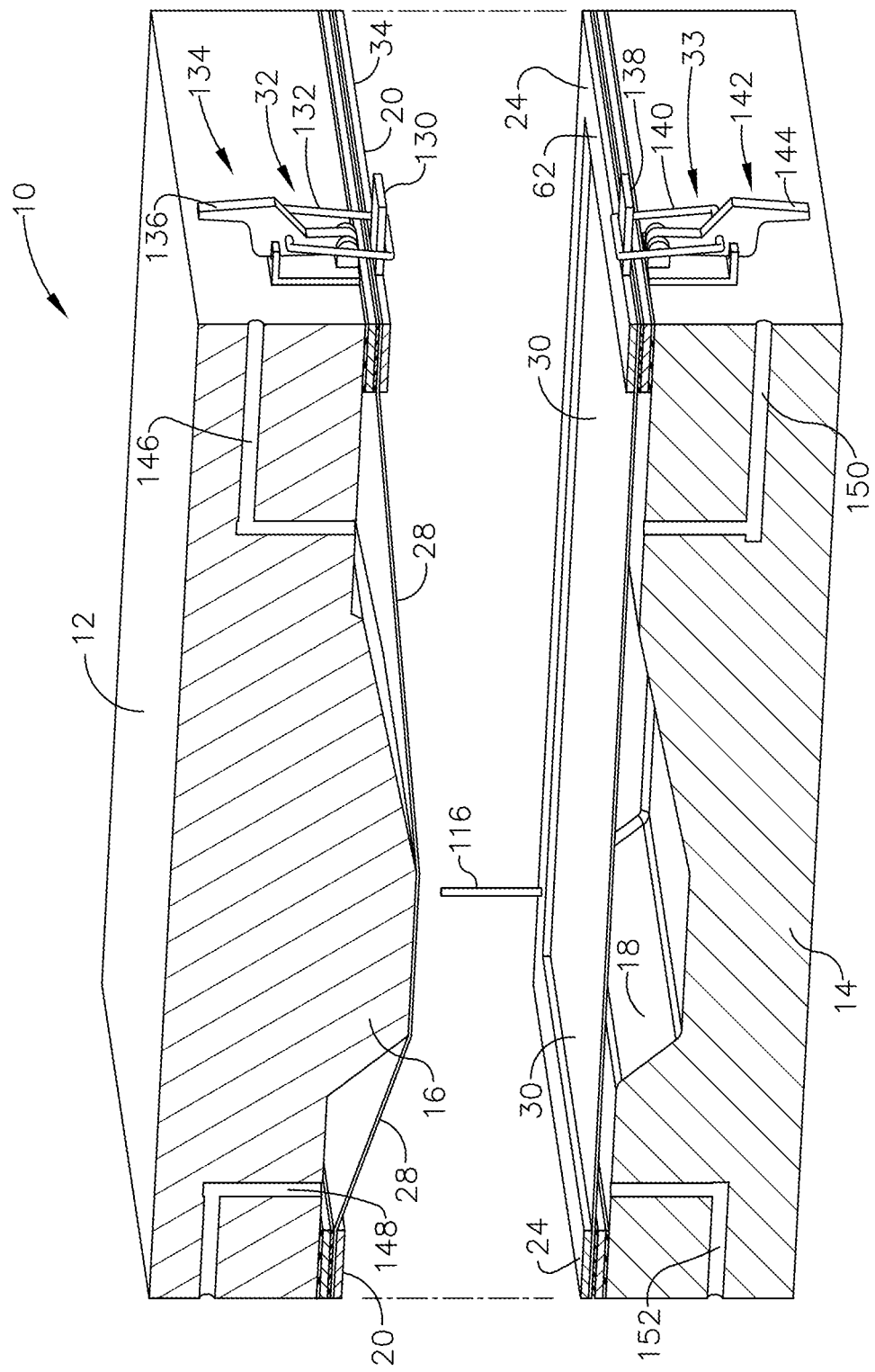
FIG. 4 is the perspective view of FIG. 3 with a frame clamped to the male die mold and a second frame clamped to the female die mold.
Figure 5:
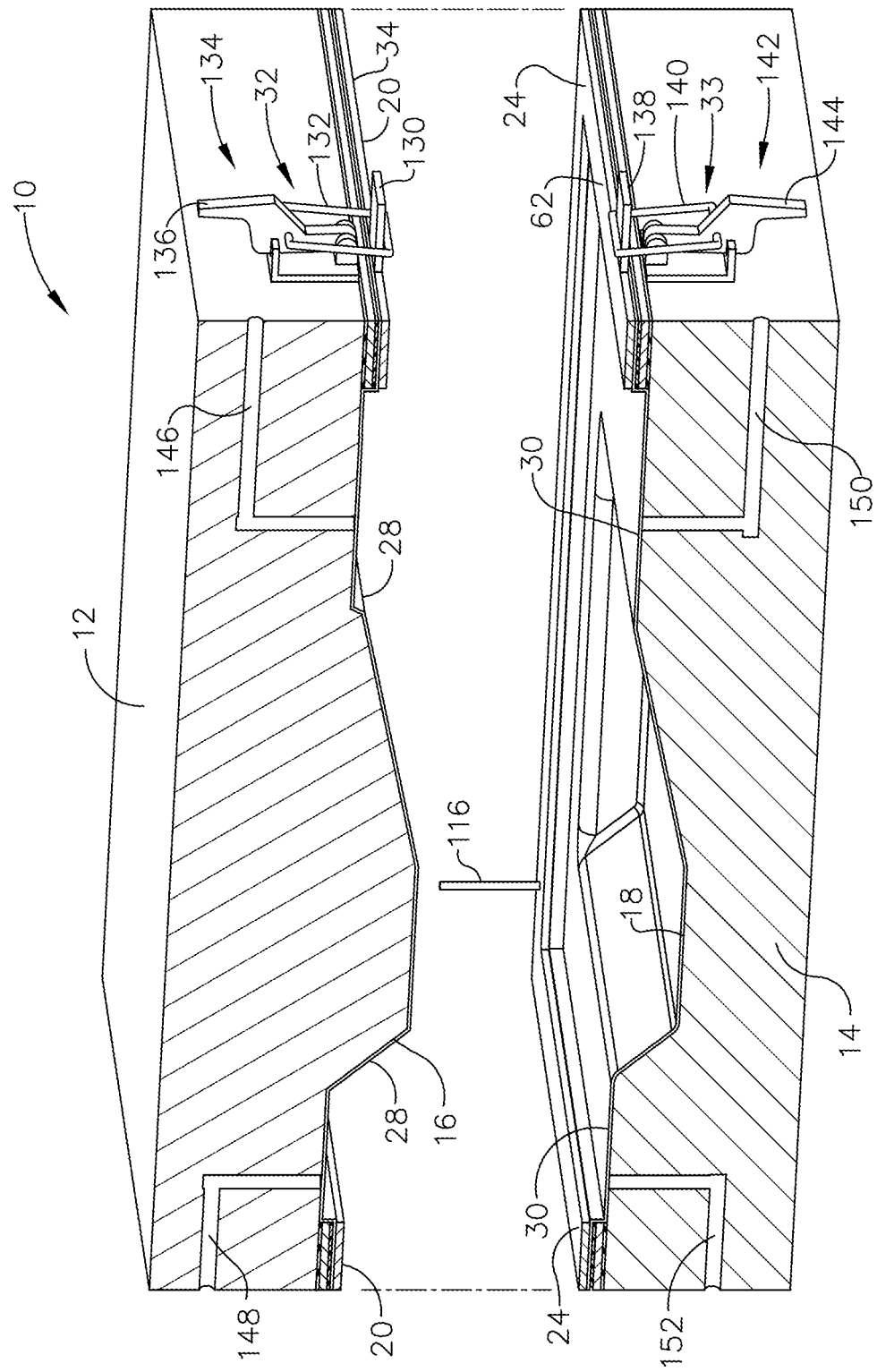
FIG. 5 is a cross section perspective view of FIG. 4 with the film layer of the frame drawn onto a first contoured surface of the male die mold and a second film layer of the second frame drawn onto a second contoured surface of the female die mold.

Frame 20 defines opening 22 and is positioned between male die mold 12 and female die mold 14. Frame 20 is adapted to position film layer 28, as seen in FIGS. 2-5, across opening 22. In this embodiment, frame 20 provides support, as described in more detail herein, to film layer 28 with film layer 28 extending across opening 22. Opening 22 is positioned in alignment with one of first contoured surface 16 and second contoured surface 18. In this embodiment, as shown in FIG. 1, opening 22 is positioned in alignment with first contoured surface 16 of male die mold 12 with frame 20 positioned onto male die mold 12, as seen in FIGS. 3-5. Also, in this embodiment, as seen in FIG. 1, second frame 24 defines second opening 26 and is positioned between frame 20 and female die mold 14. Second frame 24 is adapted to position second film layer 30, as seen in FIGS. 2-5, across second opening 26. Second frame 24 provides support to second film layer 30 with second frame layer 30 extending across second opening 26. Second opening 26 is positioned in alignment with, in this embodiment, second contoured surface 18 of female die mold 14 with positioning second frame 24 onto female die mold 14, as seen in FIGS. 3-5.

Figure 6:
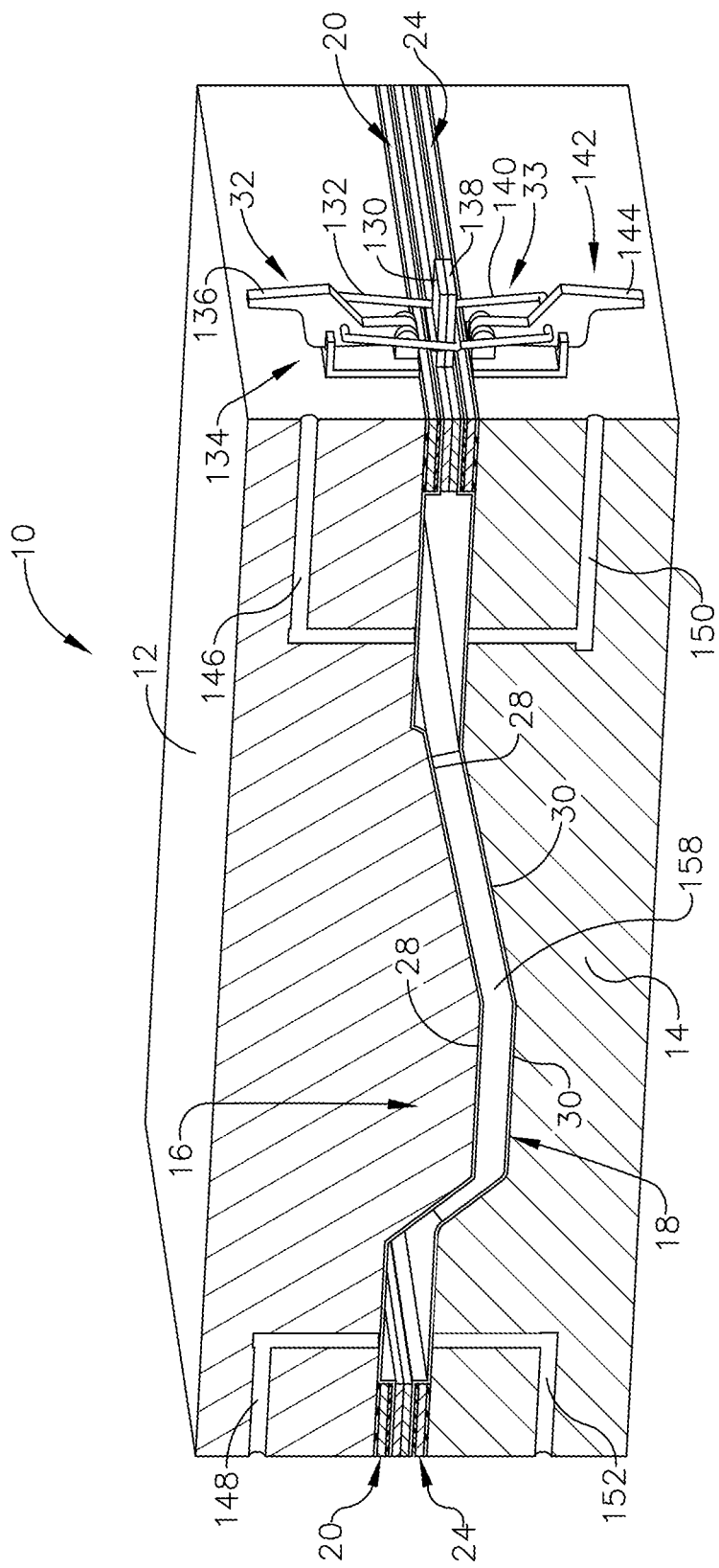
FIG. 6 is the cross section view of FIG. 5 with the male and female die molds of the match mold in a closed position exerting a compressive force onto a composite layup.
Figure 7:
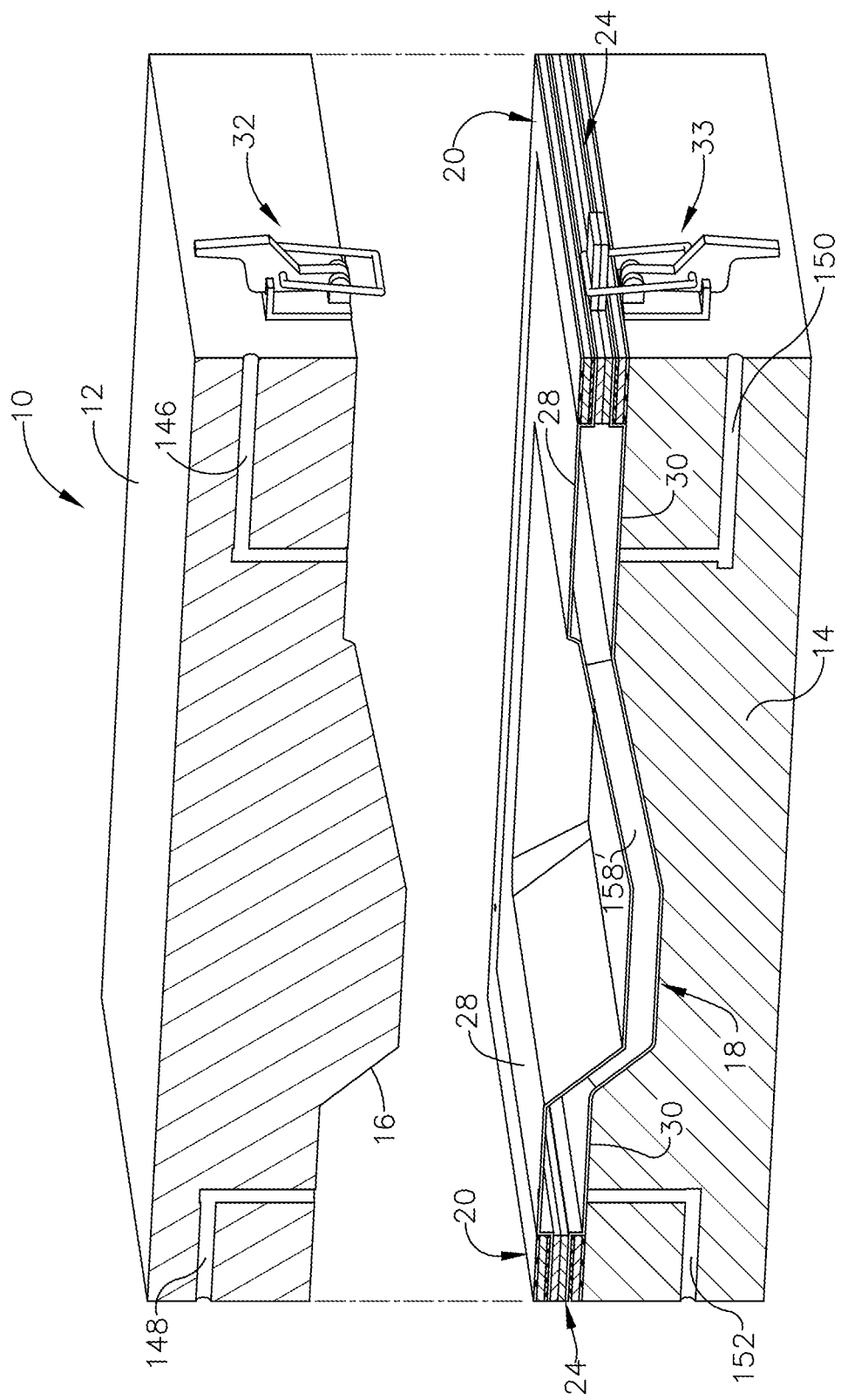
FIG. 7 is the cross section view of FIG. 6 with the male and female die molds separated providing access to a cured composite panel with the two frames in this embodiment positioned on the female die mold.
Figure 8:
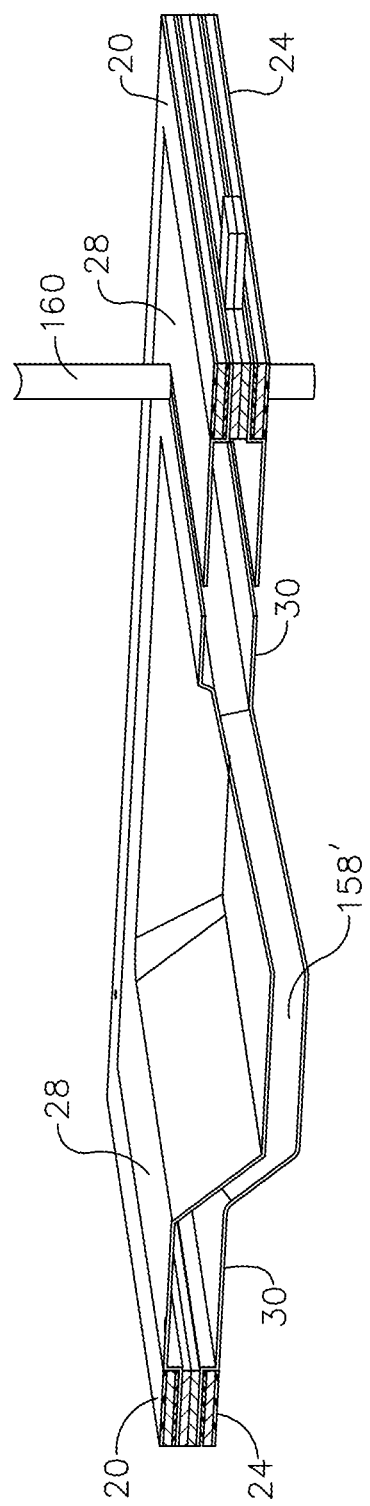
FIG. 8 is a perspective view of the cured composite panel and the two frames removed from the match mold of FIG. 7 and a cutting tool separating the cured composite panel from, in this embodiment, the two frames with film layers positioned on opposing sides of the cured composite panel.

With positioning both frame 20 associated with male die mold 12 and second frame 24 associated with female die mold 14, as shown in FIGS. 1-5, between male die mold 12 and female die mold 14, a fabricator, as will be described in more detail herein, is able to apply a film layer onto opposing sides of a composite layup 158 at the same time compressive forces are applied to composite layup 158 with matched mold 10, as shown in FIG. 6. Frame 20 is clamped to male die mold, as seen in FIG. 4, with first clamp assembly 32 with opening 22 and film layer 28 aligned with first contoured surface 16. With clamping frame 20, as seen in FIG. 4, to male die mold 12, film layer 28 is secured within frame 20 and positioned in an unwrinkled condition extending across opening 22 of frame 20. The securement of film layer 28 by frame 20, as will be discussed herein, maintains film layer 28 in an unwrinkled state when drawn onto first contoured surface 16 as seen in FIG. 5. Similarly second frame 24 is clamped to female die mold 14, as seen in FIG. 4, with second clamp assembly 33 with second opening 26 and second film layer 30 aligned with second contoured surface 18. With clamping second frame 24, as seen in FIG. 4, to female die mold 14, second film layer 30 is secured within second frame 24 and positioned in an unwrinkled condition extending across second opening 26 of second frame 24. This securement of second film layer 30 by second frame 24, as will be discussed herein, maintains second film layer 30 in an unwrinkled state when drawn onto second contoured surface 18 as seen in FIG. 5. With film layer 28 and second film layer 30 so positioned, film layer 28 and second film layer 30 will be adhered onto opposing sides of composite layup 158, uncured composite material, as seen in FIG. 6, positioned within mold 10 during compressive forming of composite layup 158 with matched die mold 10. With the application of heat composite layup 158 becomes a cured finished composite panel 158', as seen in FIGS. 7 and 8 with film layer 28 and second film layer 30 adhered to opposing sides of the finished composite panel 158'.

In another embodiment, a fabricator may choose to apply a decorative film layer or film layer onto only one of a first contoured surface 16 of male die mold 12 and second contoured surface 18 of female die mold 14. In a configuration for applying a film layer to only male die mold 12, frame 20 is provided which defines opening 22 such that frame 20 is adapted to position film layer 28 in an unwrinkled state across opening 22 and opening 22 is positioned in alignment with first contoured surface 16. Frame 20 is clamped with first clamp assembly 32, as seen in FIG. 4, onto male die mold 12. Clamping frame 20, as will be explained herein, firmly secures and supports film layer 28 in an unwrinkled state within 20. Film layer 28 is then drawn onto first contoured surface 16, as seen in FIG. 5, in an unwrinkled state. Frame 20 is positioned between male die mold 12 and female die 14 prior to match mold die 10 applying compressive forces to composite layup 158 positioned within mold 10. Prior to closing male die mold 12 and female die mold 14 composite layup 158 is positioned between male die mold 12 and female die mold 14. With the application of compressive force by matched mold die 10 onto the composite layup 158 the one side of the composite layup 158 facing male die mold 12 is brought into contact with film layer 28. With matched die mold 10 exerting a compressive force onto composite layup 158 imparting a contoured surface on opposing sides of composite layup 158 and onto film layer 28, film layer 28 adheres to a side of the composite layup facing first contoured surface 16 of male die mold 12. With the application of heat, a cured composite panel 158', as seen for example in FIGS. 7 and 8, is produced. In this embodiment, composite panel 158' will have a decorative film positioned on one side of composite panel 158'.

In another embodiment the fabricator chooses to apply a decorative film or film layer onto only second contoured surface 18 of female die mold 14. In a configuration for applying a film layer to only female die mold 14, second frame 24 is provided which defines second opening 26 such that second frame 24 is adapted to position second film layer 30 across second opening 26 in an unwrinkled state and second opening 26 is positioned in alignment with second contoured surface 18. Second frame 24 is clamped with second clamp assembly 33, as seen in FIG. 4, onto female die mold 14. Clamping second frame 24, as will be explained herein, firmly secures and supports second film layer 30 in an unwrinkled state within second frame 24. Second film layer 30 is then drawn onto second contoured surface 18, as seen in FIG. 5, in an unwrinkled state. Second frame 24 is positioned between male die mold 12 and female die mold 14 prior to match mold die 10 applying compressive forces to composite layup 158 positioned within mold 10. Prior to closing male die mold 12 and female die mold 14 a composite layup 158 is positioned between male die mold 12 and female die mold 14. With application of compressive force by matched die mold 10 onto the composite layup 158 one side of the composite layup 158 is brought into contact with second film layer 30. With matched die mold 10 exerting a compressive force onto the composite layup 158 imparting a contoured surface on opposing sides of the composite layup 158 and onto second film layer 30, second film layer 30 adheres to the side of the composite layup 158 facing second contoured surface 18 of female die 14. With the application of heat a cured composite panel 158', as seen for example in FIGS. 7 and 8, is produced. In this embodiment, composite panel 158' will have a decorative film positioned on one side of the composite panel 158'.

In referring to FIG. 2, frame 20, which in this embodiment is associated with male die mold 12, includes first sub-frame component 34 and second sub-frame component 36. First sub-frame component 34 and second sub-frame component 36 are, in this embodiment, constructed of a material of a composite composition or other suitable material. First sub-frame component 34 and second sub-frame component 36 are configured to secure decorative film or film layer 28 between first sub-frame component 34 and second sub-frame component 36 for film layer 28 to extend from frame 20 across opening 22 defined by frame 20. Decorative film or film layer 28 is secured or clamped between first and second sub-frame component assemblies 34 and 36 with first clamp assembly 32, as seen in FIGS. 2 and 4. Clamping film layer 28 in this configuration maintains film layer 28 in an unwrinkled condition across opening 22, as seen in FIG. 4, with the film layer 28 drawn onto first contoured surface 16, as seen in FIG. 5. With film layer 28 in an unwrinkled position, matched die mold 10 applies a compressive force onto film layer 28 and composite layup 158, as seen in FIG. 6 and an application of heat is made. In contouring the composite layup 158 and film layer 28 with first contoured surface 16, first film layer 28 adheres to composite layup 158 and with the application of heat a cured composite panel 158' is formed, as seen for example in FIGS. 7 and 8 having a decorative film layer 28 positioned on one side of the cured composite panel 158'.

An example of an arrangement of frame 20 is shown in FIG. 2. Film layer 28 overlies first sub-frame component 34. In this configuration, first side 38 of the film layer 28 overlies side 40 of first sub-frame component 34. Second opposing side 42 of film layer 28 abuts against first side 44 of seal 46. Seal 46 or bulb seal in this embodiment is positioned between film layer 28 and second sub-frame component 36. Seal 46 is constructed of silicone or other suitable material to facilitate providing an air tight seal between seal 46 and second opposing side 42 of film layer 28 with frame 20 clamped to male die mold 12. Second opposing side 48 of seal 46 abuts against first side 50 of second sub-frame component 36 and facilitates providing an air tight seal between first side 50 of second sub-frame component 36 and seal 46 with frame 20 clamped to male die mold 12. Further in the construction of frame 20, die seal 56 is positioned between second sub-frame component 36 and surface 60 of male die mold 12. Die seal 56 is similarly constructed as that of seal 46. Second opposing side 52 of second sub-frame component 36 abuts against first side 54 of die seal 56. Second opposing side 52 of second sub-frame component 36 also facilitates providing an air tight seal with first side 54 of die seal 56 with frame 20 clamped to male die mold 12. In this embodiment, second opposing side 58 of die seal 56 abuts surface 60, seen in FIG. 1, of male die mold 12 also facilitating providing an air tight seal between die seal 56 and surface 60 male die mold 12 with frame 20 clamped to male die mold 12. With frame 20 clamped with first clamp assembly 32 to male die mold 12, as seen in FIG. 4, film layer 28 is secured in an unwrinkled state and an air tight seal is formed with frame 20 and film layer 28 such that a reduction of air pressure between first contoured surface 16 and film layer 28 permits film layer 28 to be positioned against first contoured surface 16 in an unwrinkled state, as seen in FIG. 5.

In referring to FIG. 2, second frame 24, which in this embodiment is associated with female die mold 14, includes third sub-frame component 62 and fourth sub-frame component 64. Third sub-frame component 62 and fourth sub-frame component 64 are constructed of a material, in this example, of a composite composition or other suitable material. Third sub-frame component 62 and fourth sub-frame component 64 are configured to secure decorative film layer or second film layer 30 between third sub-frame component 62 and fourth sub-frame component 64 for second film layer 30 to extend from second frame 24 across opening 26 defined by the frame 24. Decorative layer or second film layer 30 is secured or clamped between third sub-frame component 62 and fourth sub-frame component 64 with second clamp assembly 33, as seen in FIGS. 2 and 4. Clamping second film layer 30 in this configuration maintains second film layer 30 in an unwrinkled condition across second opening 26, as seen in FIG. 4 and with second film layer 30 drawn onto second contoured surface 18, as seen in FIG. 5. With second film layer 30 in an unwrinkled state matched die mold 10 applies a compressive force onto second film layer 30 and composite layup 158, as seen in FIG. 6 and an application of heat is made. In contouring the composite layup 158 and second film layer 30 with second contoured surface 18, second film layer 30 adheres to the composite layup 158. The application of heat results in producing a cured composite panel 158', as seen for example in FIGS. 7 and 8 having second decorative film layer 30 positioned on one side of the cured composite panel 158'.

An example of an arrangement of second frame 24 is shown in FIG. 2. Second film layer 30 overlies third sub-frame component 62. In this configuration, first side 66 of the second film layer 30 overlies side 68 of third sub-frame component 62. Second opposing side 70 of second film layer 30 abuts against first side 72 of seal 74. Seal 74 or bulb seal, in this embodiment, is positioned between second film layer 30 and third sub-frame component 62. Seal 74 is constructed of silicone or other suitable material to facilitate providing an air tight seal between seal 74 and second opposing side 70 of second film layer 30 with second frame 24 clamped to female die mold 14. Second opposing side 76 of seal 74 abuts against first side 78 of fourth sub-frame component 64 and facilitates providing an air tight seal between first side 78 of fourth sub-frame component 64 and seal 74 with second frame 24 clamped to female die mold 14. Further in construction of second frame 24, die seal 84 is positioned between fourth sub-frame component 64 and surface 88 of female die mold 14. Die seal 84 is similarly constructed as seal 74. Second opposing side 80 of fourth sub-frame component 64 abuts against first side 82 of die seal 84. Second opposing side 80 of fourth sub-frame component 64 also facilitates providing an air tight seal with first side 82 of die seal 84 with second frame 24 clamped to female die mold 14. In this embodiment, second opposing side 86 of die seal 84 abuts against surface 88, seen in FIG. 1, of female die mold 14 facilitating providing an air tight seal between die seal 84 and surface 88 of female die mold 14 with second frame 24 clamped to female die mold 14. With second frame 24 clamped with second clamp assembly 33 to female die mold 14, as seen in FIG. 4, second film layer 30 is secured in an unwrinkled state and an air tight seal is formed with second frame 24 and second film layer 30 such that a reduction of air pressure between second contoured surface 18 and second film layer 30 permits second film layer 30 to be positioned against second contoured surface 18 in an unwrinkled state.

As described above, this embodiment utilizes frame 20 for positioning film layer 28 such that film layer 28 is drawn against first contoured surface 16 and utilizes second frame 24 for positioning film layer 30 such that second film layer 30 is drawn against second contoured surface 18. In another embodiment, as mentioned above, the fabricator chooses the composite layup that is to be contoured in matched die mold 10 to have one side of the composite layup to carry a decorative or layered film adhered to the finished cured composite panel 158'. The fabrication in this embodiment positions a film layer to be drawn against only one of first contoured surface 16 and second contoured surface 18. As described earlier, frame 20 in one embodiment is used with matched die mold 10 to position film layer 28 to overlie first contoured surface 16 and adhere to the side of the composite layup that faces male die mold 12. In another embodiment, second frame 24 is used with matched die mold 10 to position second film layer 30 to overlie second contoured surface 18 and adhere to the side of the composite layup that faces female die mold 14.

In aligning a frame onto either of male die mold 12 or onto female die mold 14, as will be discussed herein in more detail, a first pin 94, as seen in FIG. 1, secured to male die mold 12 and second pin 116, as seen in FIG. 1, secured to female die mold 14, are used in this embodiment, to engage first pin hole 154 positioned through frame 20 and second pin hole 156 positioned through second frame 24 respectively. In this arrangement the fabricator can place frame 20, for example, onto male die mold 12 with first pin 94 extending through first pin hole 154 which is positioned to extend through frame 20. This will facilitate the fabricator in aligning frame 20 and opening 22 with first contoured surface 16. This would similarly work for facilitating alignment of second frame 24 and second opening 26 with second contoured surface 18 with utilizing second pin 116 to engage second pin hole 156 through second frame 24. Moreover, in additional embodiments, two or more pins can be secured to male die mold 12 to correspond to pin holes provided to extend through frame 20 so as to align frame 20 and opening 22 to first contoured surface 16. Also, two or more pins can be secured to female die mold 14 to correspond to pin holes provided to extend through second frame 24 so as to align second frame 24 and second opening 26 to second contoured surface 18. In one example, as seen in FIGS. 1 and 2, facilitating alignment of frame 20 such that opening 22 and film layer 28 are positioned in alignment with contoured surface 16 is shown. As seen in FIG. 2, first sub-frame component 34 defines first hole 90 and second sub-frame component 36 defines second hole 92. First pin 94 is secured to male die mold 12, as seen in FIG. 1. With first pin 94 secured to male die mold 12, first pin 94 extends from male die mold 12 through first pin hole 154 of frame 20 which includes first hole 90 and second hole 92. In addition, first pin 94 also passes through third hole 96 of film layer 28, fourth hole 98 of seal 46 and fifth hole 100 of die seal 56 which are all also part of first pin hole 154 and are aligned with first pin hole 90 and second hole 92. This arrangement facilitates positioning first sub-frame component 34, film layer 28, seal 46, second sub-frame component 36 and die seal 56 in alignment on male die mold 12.

As mentioned above in other embodiments, two or more pins can be secured to each of male die mold 12 and female die mold 14. An example of such an embodiment would include employing two pins which are secured to male die mold 12, such as first pin 94 and an additional pin (not shown). The two pins can extend through frame 20, such as first pin 94 extending through first pin hole 154, described above, and the additional pin (not shown) similarly can extend through a pin hole (not shown) which extends through frame 20 similar to above described first pin hole 154. The extending of first pin 94 and the additional pin (not shown) through frame 20 and through first pin hole 154 and the pin hole (not shown) respectively, facilitates alignment of frame 20 to male die mold 12.

In an embodiment where two frames are used, frame 20 and second frame 24 are employed with matched die mold 10, as seen in FIGS. 1 and 2. Third pin hole 162 is positioned through second frame 24 which also aligns with first pin 94 such that in closing matched die mold 10, first pin 94 penetrates third pin hole 162 in second frame 24 placing alignment between frame 20 and second frame 24. Third pin hole 162 extends through second frame 24 which includes first hole 102 defined in third sub-frame component 62, second hole 104 defined in second film layer 30, third hole 106 defined in seal 74, fourth hole 108 defined in fourth sub-frame component 64 and fifth hole 110 defined in die seal 84. Similarly should the additional pin (not shown), as described above, be secured to male die mold 12, an additional pin hole (not shown) defined through frame 24 and aligned with this additional pin (not shown) can permit the additional pin to extend from male die mold 12 and through second frame 24 facilitating alignment of frame 20 with respect to male die mold 12 and with second frame 24.

In aligning second frame 24 onto female die mold 14 such that opening 26 and second film layer 30 are positioned in alignment with second contoured surface 18, as seen in FIGS. 1 and 2, this arrangement is similar to that described above for aligning frame 20 with male die mold 12. In this example, with respect to second frame 24, third sub-frame component 62 defines sixth hole 112 and fourth sub-frame component 64 defines seventh hole 114. Second pin 116 is secured to female die mold 14 as seen in FIG. 1. With second pin 116 secured to female die mold 14, second pin 116 extends from female die mold 14 through second pin hole 156 of frame 24 which includes sixth hole 112 and seventh hole 114. In addition, second pin 116 also passes through eighth hole 118 of second film layer 30, hole (not shown) of seal 74 and ninth hole 120 of die seal 84 which are all also part of second pin hole 156 and are aligned with sixth hole 112 and seventh hole 114. This arrangement facilitates positioning third sub-frame component 62, film layer 30, seal 74, fourth sub-frame component 64 and die seal 84 in alignment on female die mold 14.

As mentioned above, in other embodiments, two or more pins can be secured to each of male die mold 12 and female die mold 14. An example of such an embodiment would include employing two pins which are secured to female die mold 14, such as second pin 116 and another pin (not shown). The two pins can extend through second frame 24, such as second pin 116 extending through second pin hole 156, described above, and the other pin (not shown) similarly can extend through a pin hole (not shown) which extends through frame 24 similar to above described second pin hole 156. The extending of second pin 116 and the other pin (not shown) through frame 24 and through the above described components within frame 24 facilitates alignment of frame 24 to female die mold 14.

In an embodiment where two frames are used, frame 20 and second frame 24 are employed with matched die mold 10, as seen in FIGS. 1 and 2. Fourth pin hole 164 is positioned through frame 20 which also aligns with second pin 116 such that in closing matched die mold 10, second pin 116 penetrates fourth pin hole 164 placing alignment between frame 20 and second frame 24. Fourth pin hole 164 extends through frame 20 which includes hole (not shown) defined in first sub-frame component 34, sixth hole 122 defined in film layer 28, seventh hole 124 defined in seal 46, eighth hole 126 defined in second sub-frame component 36 and ninth hole 128 defined in die seal 56. Similarly should another pin (not shown), as described above, be secured to female die mold 14, an additional pin hole (not shown) defined through frame 20 and aligned with this other pin (not shown) can permit the other pin to extend from female die 14 and through frame 20 facilitating alignment of second frame 24 with respect to female die mold 14 and with frame 20.

A releasable clamp assembly is used to secure a frame to one of the male die mold 12 and female die mold 14. In other embodiments, two or more releasable clamp assemblies may be used as needed to secure a frame to a particular die mold. With either one or both of frame 20 and second frame 24 being used with matched die mold 10, these frames are secured to their respective die mold with a releasable clamp assembly. For example, as seen in FIGS. 3-6, frame 20 is releasably secured or releasably clamped to male die mold 12 with releasable first clamp assembly 32. First latch 130 is secured to and extends from first sub-frame component 34 and is engaged with first catch 132 of first handle assembly 134. First handle assembly 134 is secured to male die mold 12. With first catch 132 engaged to first latch 130 first handle 136 is rotated in a direction away from frame 20 clamping frame 20 to male die mold 12 exerting a clamping force which compresses the earlier described arrangement of frame 20 and secures film layer 28 in an unwrinkled state to be drawn into first contoured surface 16 in an unwrinkled state. With the compressive force applied to frame 20, an air tight seal is formed by frame 20 along with film layer 28 with respect to first contoured surface 16. Reversing movement of first handle 134 releases the clamping force placed onto frame 20 and releases securement of frame 20 to male die mold 12. This arrangement with releasable first clamp assembly 32 and frame 20 is utilized in the embodiment where frame 20 is solely employed with matched die mold 10 or in the embodiment where both frame 20 and second frame 24 are employed with matched die mold 10.

Where the frame is second frame 24, second frame 24 is releasably secured or clamped to female die mold 14, as seen in FIGS. 3-6, with second clamp assembly 33. Second latch 138 is secured to and extends from third sub-frame component 62 and is engaged with second catch 140 of second handle assembly 142. Second handle assembly 142 is secured to female die mold 14. With second catch 140 engaged to second latch 138 second handle 144 is rotated in a direction away from second frame 24 clamping second frame 24 to female die mold 14 exerting a clamping force which compresses the earlier described arrangement of second frame 24 and secures second film layer 30 in an unwrinkled state to be drawn onto second contoured surface 18 in an unwrinkled state. With the compressive force applied to second frame 24, an air tight seal is formed by frame 24 along with second film layer 30 with respect to second contoured surface 18. Reversing movement of second handle 144 releases the clamping force placed onto second frame 24 and releases securement of second frame 24 to female die mold 14. This arrangement with releasable second clamp assembly 33 and second frame 24 is utilized in the embodiment where second frame 24 is solely employed with matched die mold 10 or in the embodiment where both frame 20 and second frame 24 are employed with matched die mold 10.

With employment of frame 20 either alone with respect to matched die mold 10 or in conjunction with second frame 24 with respect to matched die mold 10, a reduced air pressure is applied to film layer 28 to position film layer 28 against first contoured surface 16, as seen in FIG. 5. With the air tight seal accomplished with respect to frame 20 and film layer 28 with frame 20 clamped down onto male die mold 12, as seen in FIG. 4, reduced air pressure can be applied between film layer 28 and first contoured surface 16. The reduction of air pressure is applied to the region between film layer 28 and first contoured surface 16 in this embodiment with first vacuum port 146 along with third vacuum port 148. Both first vacuum port 146 and third vacuum port 148 are in communication with first contoured surface 16 of male die mold 12. With this reduction of air pressure, film layer 28 is positioned against first contoured surface 16 as seen in FIG. 5.

Similarly with employment of second frame 24 either alone with respect to matched die mold 10 or in conjunction with frame 20 with respect to matched die mold 10, a reduced air pressure is applied to second film layer 30 to position second film layer 30 against second contoured surface 18, as seen in FIG. 5. With the air tight seal accomplished with respect to second frame 24 and second film layer 30 with second frame 24 clamped down onto female die mold 14, as seen in FIG. 4, a reduced air pressure is applied between second film layer 30 and second contoured surface 18. The reduction of air pressure is applied to the region between second film layer 30 and second contoured surface 18, in this embodiment, with second vacuum port 150 along with fourth vacuum port 152. Both second vacuum port 150 and fourth vacuum port 152 are in communication with second contoured surface 18 of female die 14. With this reduction of air pressure, second film layer 30 is positioned against second contoured surface 18 as seen in FIG. 5. It should be appreciated the number and locations of vacuum ports used in association with male and female die molds 12 and 14 may vary. Vacuum ports are employed so as to accommodate the geometry and size of the of the surface, such as first contour surface 16 and second contour surface 18, upon which film layer 28 and second film layer 30 respectively are to be drawn.

Figure 9A:
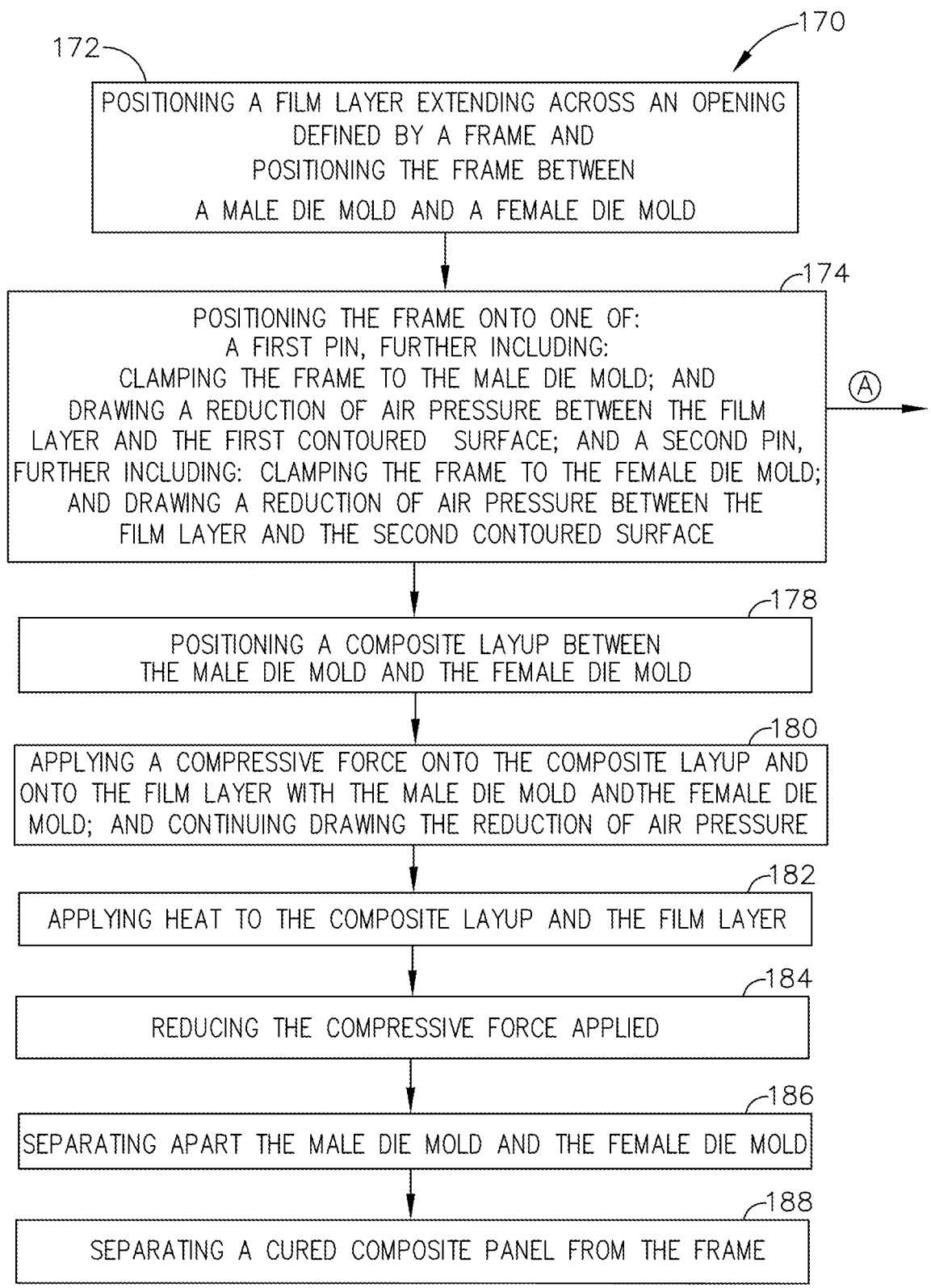
FIGS. 9A and 9B is a flow chart of the method of making a contoured composite panel with a decorative outer layer positioned on at least one side of the composite panel.
Figure 9B:
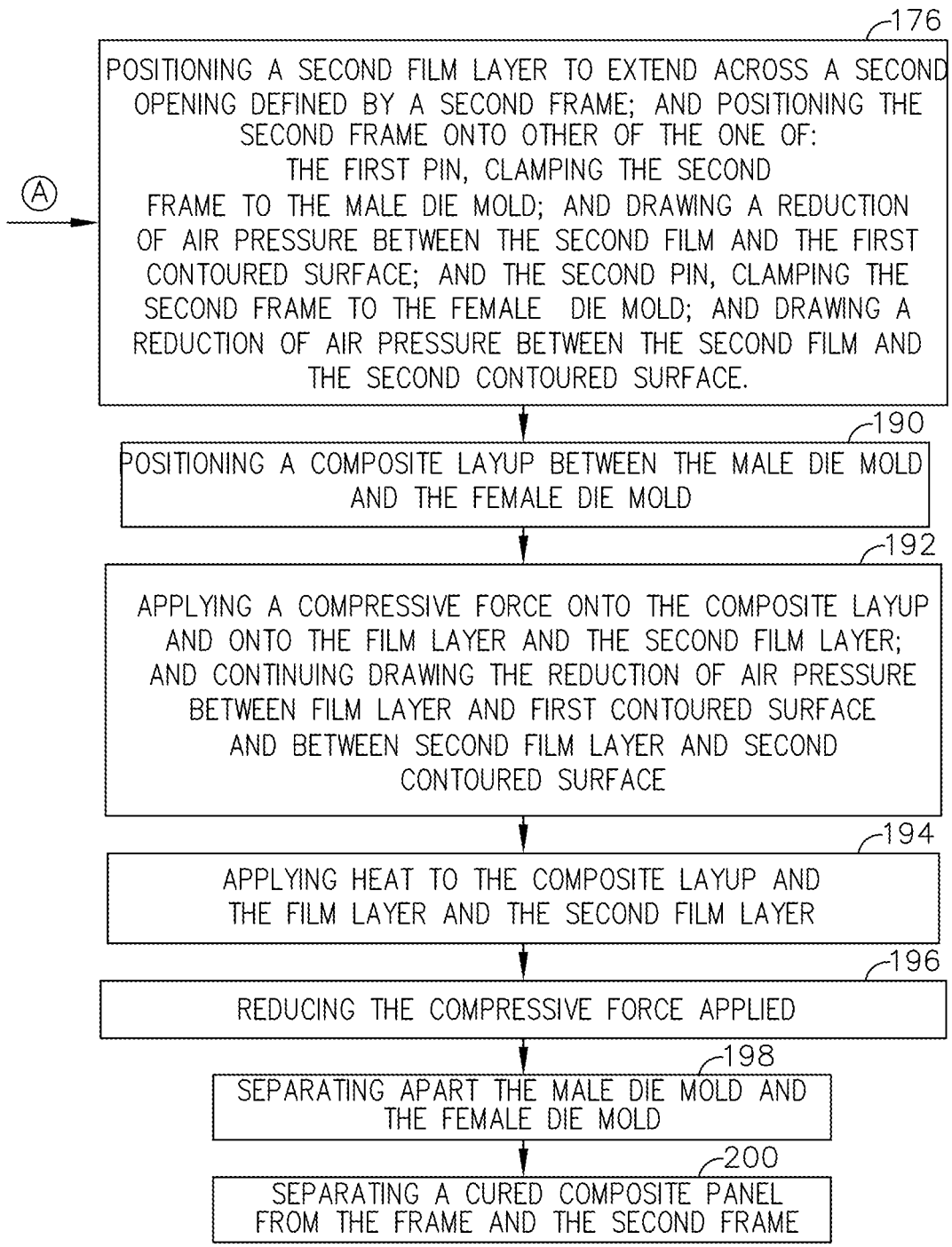

With the use of the improved matched die mold 10 described herein, an efficient method 170 for making a contoured composite panel 158' from composite layup 158, as seen in FIGS. 9A and 9B, can be employed. Composite layup 158 is contoured with compressive forces applied by matched die mold 10 and at the same time a decorative film or film layer is applied to one or both sides of the composite layup 158, wherein with the application of heat a cured composite panel 158' with a decorative film layer is produced. Method 170 includes, step 172 as seen in FIG. 9A. Step 172 includes positioning a film layer extending across an opening defined by a frame. In step 172 positioning includes one of film layer 28 extending across opening 22 defined by frame 20 and second film layer 30 extending across second opening 26 defined by second frame 24. Additionally step 172 includes positioning the frame between a male die mold and a female die mold. Regardless of whether frame 20 or second frame 24 is used in step 172, either frame would be positioned between male die mold 12 and female die mold 14. As described earlier, male die mold 12 defines first contoured surface 16 and female die mold 14 defines second contoured surface 18. Step 172 includes positioning the frame which includes the opening and the film layer extending across the opening in alignment with one of first contoured surface 16 and second contoured surface 18. Thus, if frame 20 is employed in step 172, opening 22 and film layer 28 would be positioned in alignment with first contoured surface 16. If second frame 24 is employed in step 172, second opening 26 and second film layer 30 would be positioned in alignment with second contoured surface 18.

Step 174 of method 170 further includes positioning the frame onto one of male die mold 12 and female die mold 14 of match mold 10, which includes positioning the frame onto one of first pin 94 of male die mold 12 and second pin 116 of female die mold 14. In the instance of frame 20 being utilized, frame 20 is positioned onto first pin 94 through first pin hole 154 defined by frame 20 wherein first pin 94 extends from male die mold 12 facilitating aligning film layer 28 and opening 22 of frame 20 with first contoured surface 16. Further included in step 174 is clamping frame 20 to male die mold 12, as described earlier, and drawing a reduction of air pressure between film layer 28 and first contoured surface 16. This provides film layer 28 to be positioned against first contoured surface 16 in an unwrinkled state as discussed earlier. Otherwise, in step 174, in the instance the fabricator is using second frame 24 as the frame, second frame 24 is positioned onto second pin 116 through second pin hole 156 defined by second frame 24 wherein second pin 116 extends from female die mold 14 facilitating aligning second film layer 30 and second opening 26 of second frame 24 with second contoured surface 18. In this instance, step 174 includes clamping second frame 24 to female die mold 14 and drawing a reduction of air pressure between second film layer 30 and second contoured surface 18. This provides second film layer 30 to be positioned against second contoured surface 18 in an unwrinkled state as discussed earlier. With implementation of step 174, a film layer is positioned against one of first contoured surface 16 and second contoured surface 18 such that one side of a finished composite panel 158' will carry a film layer on the finished composite panel 158'. Step 178 includes positioning composite layup 158 between male die 12 and female die 14. Composite layup 158 is constructed from one of a wide variety of different constructions. In this example, composite layup 158 will be used in the construction of an interior of an aircraft. Composite layup 158 includes, in this example, at least two layers of pre-impregnated composite material positioned on each opposing side of a central layer. The central layer is in this example constructed of a core material. The material employed of composite layup 158 will be suitable to forming contours onto the surface of composite layup 158 with use of matched die mold 10 with one of opposing surfaces of composite layup 158 adhering to one film layer or decorative layer such as 28 and 30, such as a polyvinyl fluoride film.

Step 180 includes applying a compressive force onto composite layup 158 and onto film layer being either film layer 28 or second film layer 30. The compressive force is applied with male die mold 12 and female die mold 14. In this example, a continuing drawing of the reduction of air pressure between film layer 28 and first contoured surface 16 is employed with film layer 28 is to be applied to composite layup 158 which faces male die mold 12. Should the film layer be second film layer 30 which is positioned against second contoured surface 18, continuing drawing the reduction of air pressure between second film layer 30 and second contoured surface 18 is employed with second film layer 30 is to be applied to composite layup 158 which faces female die mold 14. In this example, the compressive force applied includes up to and including two hundred pounds per square inch (200 lbs/sq. in.).

Step 182 includes applying heat to composite layup 158 and the film layer. The heat is applied to one of film layer 28 and second film layer 30. In applying heat to composite layup 158 and the film layer, in this example, a temperature up to and including three hundred and twenty degrees Fahrenheit (320° F.) is applied. The application of heat to composite layup 158 with the film layer will provide a finished cured composite panel 158'.

Step 184 includes reducing the compressive force applied by male die mold 12 and female die mold 14. At this point, step 186 includes separating apart male die mold 12 and female die mold 14. The separation of male die mold 12 and female die mold 14 can be seen for example in FIG. 7 where an example of both film layer 28 and second film layer 30 have been applied to composite panel 158', which will be discussed below.

Step 188 includes separating cured composite panel 158' from the frame. In this step, either frame 20 or second frame 24 will have been utilized. A router 160 as seen in FIG. 8 can be used to cut either film layer 28 or second film layer 30 separating composite panel 158' from either frame 20 or second frame 24. An example of separating cured composite panel 158' from two frames can be seen for example in FIG. 8 where router 160 is used to cut composite panel 158' away from both frame 20 and second frame 24 which will be discussed below. At this point, upon the completion of step 188, cured composite panel 158' has a film layer, either film layer 28 or second film layer 30, adhered to one side of composite panel 158'.

In progressing from step 174 to step 176, the fabricator with employing step 176 will now have applied both film layer 28 and second film layer 30 to opposing sides of composite layup 158 in producing composite panel 158'. Step 176 includes positioning a second film layer to extend across a second opening defined by a second frame. If film layer 28 was used in step 174 as the film layer then second film layer in step 176 will include second film layer 30. Thus in step 176 second film layer will be second film layer 30 which would extend across second opening 26 defined by second frame 24. However, should second film layer 30 have been used in step 174 as the film layer then the second film layer in step 176 will include film layer 28 which would extend across opening 22 as the second opening in step 176 defined by frame 20 as the second frame in step 176.

Thus in step 174, with the frame position onto first pin, in step 176 the second frame would be positioned onto other than the first pin and would be positioned on the second pin. In one example, in step 174 frame 20 as the frame would be positioned onto first pin 94 then in step 176 second frame 24 as the second frame would be positioned onto the other than the first pin or onto second pin 116. In this example, step 176 would include clamping second frame 24 onto female die mold 14 and drawing a reduction of air pressure between the second film layer 30 and second contoured surface 18. As a result in this example, upon the completion of step 176, film 28 would have been positioned against first contoured surface 16 of male die mold 12 in step 174 and second film layer 30 would have been positioned against second contoured surface 18 of female die mold 14 in step 176. This provides the fabricator to be able to apply a film layer onto opposing sides of composite layup 158 to produce a finished composite panel 158' with a film layer positioned on opposing sides of composite panel 158'

Thus, alternatively, in step 174, the frame was positioned on second pin, in step 176 the second frame would be positioned onto other than the second pin and would be positioned on the first pin. In this example, in step 174 second frame 24 as the frame would be positioned onto second pin 116 then in step 176 frame 20 as the second frame would be position onto the other than the second pin or onto first pin 94. In this example step 176 would include clamping frame 20 onto male die mold 12 and drawing a reduction of air pressure between film layer 28 and first contoured surface 16. As a result upon completion of step 176, second film layer 30 would have been positioned against second contoured surface 18 of female die mold 14 in step 174 and film layer 28 would have been positioned against first contoured surface 16 of male die mold 12 in step 176. This provides the fabricator to be able to apply a film layer onto opposing sides of composite layup 158 to produce a finished composite panel 158' with a film layer positioned on opposing sides of composite panel 158'.

Step 190 includes positioning composite layup 158 between male die mold 12 and female die mold 14. Composite layup 158 is constructed as described earlier herein. Step 192 includes applying a compressive force onto composite layup 158 and onto film layer 28 and second film layer 30, as seen in FIG. 6. As discussed earlier, the compressive force applied includes up to and including two hundred pounds per square inch (200 lbs/sq. in.). In this embodiment, step 192 includes continuing drawing reduction of air pressure between film layer 28 and first contoured surface 16 and between second film layer 30 and second contoured surface 18.

Step 194 includes applying heat to composite layup 158, to film layer 28 and to second film layer 30. In this example, the application of heat, as mention above, includes attaining a temperature up to and including three hundred and twenty degrees Fahrenheit (320° F.). This application of heat to composite layup 158 and to film layer 28 and second film layer 30 will provide a finished cured composite panel 158'.

Step 196 includes reducing the compressive force applied by male die mold 12 and female die mold 14. At this point, step 198 includes separating apart male die mold 12 and female die mold 14. The separation of male die mold 12 and female die mold 14 can be seen in FIG. 7. In this example, both frame 20 and second frame 24 have been positioned resting on female die mold 14 thereby providing very little disturbance to film layer 28 and its securement to composite panel 158'.

Step 200 includes separating cured composite panel 158' from frame 20 and second frame 24. An example of separating cured composite panel 158' from the frame 20 and second frame 24 can be seen in FIG. 8 where router 160 is used to cut through film layer 28 and second film layer 30 separating composite panel 158' from both frame 20 and second frame 24. At this point, upon the completion of step 200, cured composite panel 158' has a film layer positioned adhered to opposing sides of cured composite panel 158'.

As mentioned above, there is a need to fabricate structural sandwich panels utilizing matched die mold apparatus which will take less time and effort to produce the structural sandwich panel. There is also a need to a structural sandwich panel so as to have a surface that does not require surface preparation and secondary decorative application processing which is costly and time consuming.

Figure 10:
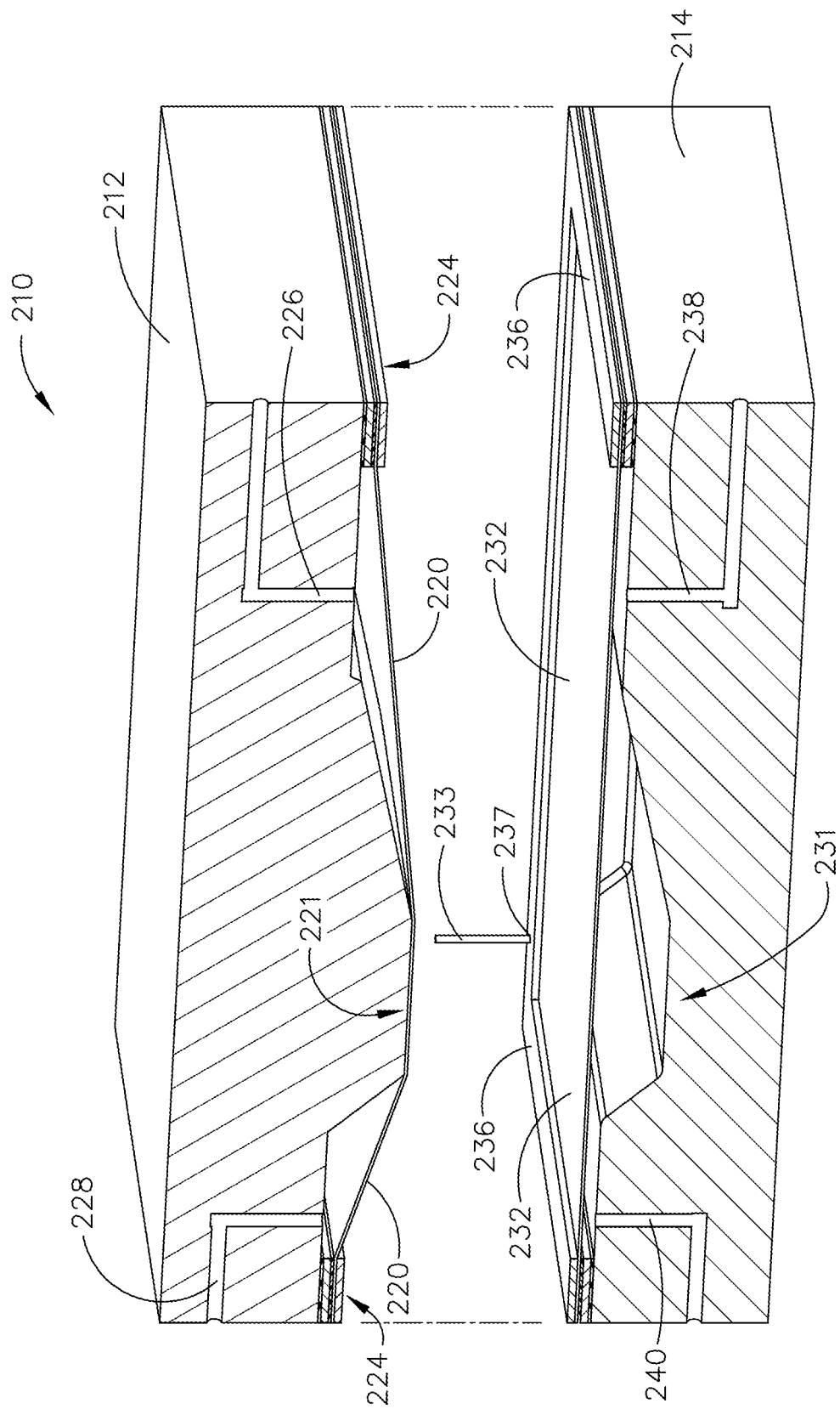
FIG. 10 is a perspective cross section view of a matched die mold apparatus with a thermoplastic skin element in an overlying relationship with each of the male die mold and the female die mold.
Figure 11:
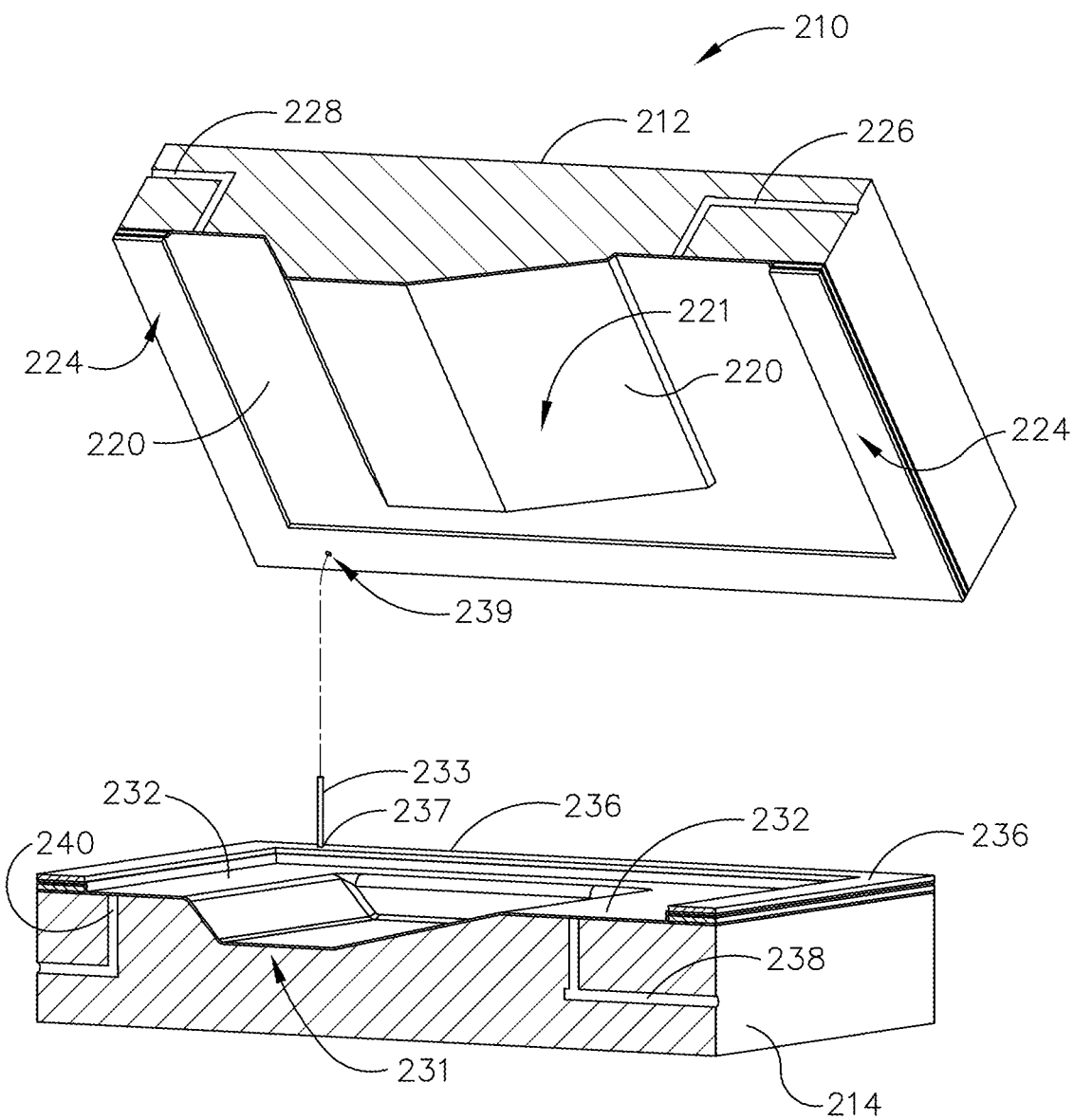
FIG. 11 is the perspective cross section view of FIG. 10 with an application of reduction of pressure between the thermoplastic skin element positioned in overlying relationship with the male die mold and an application of reduction of pressure between the thermoplastic skin element positioned in overlying relationship with the female die mold.
Figure 14:
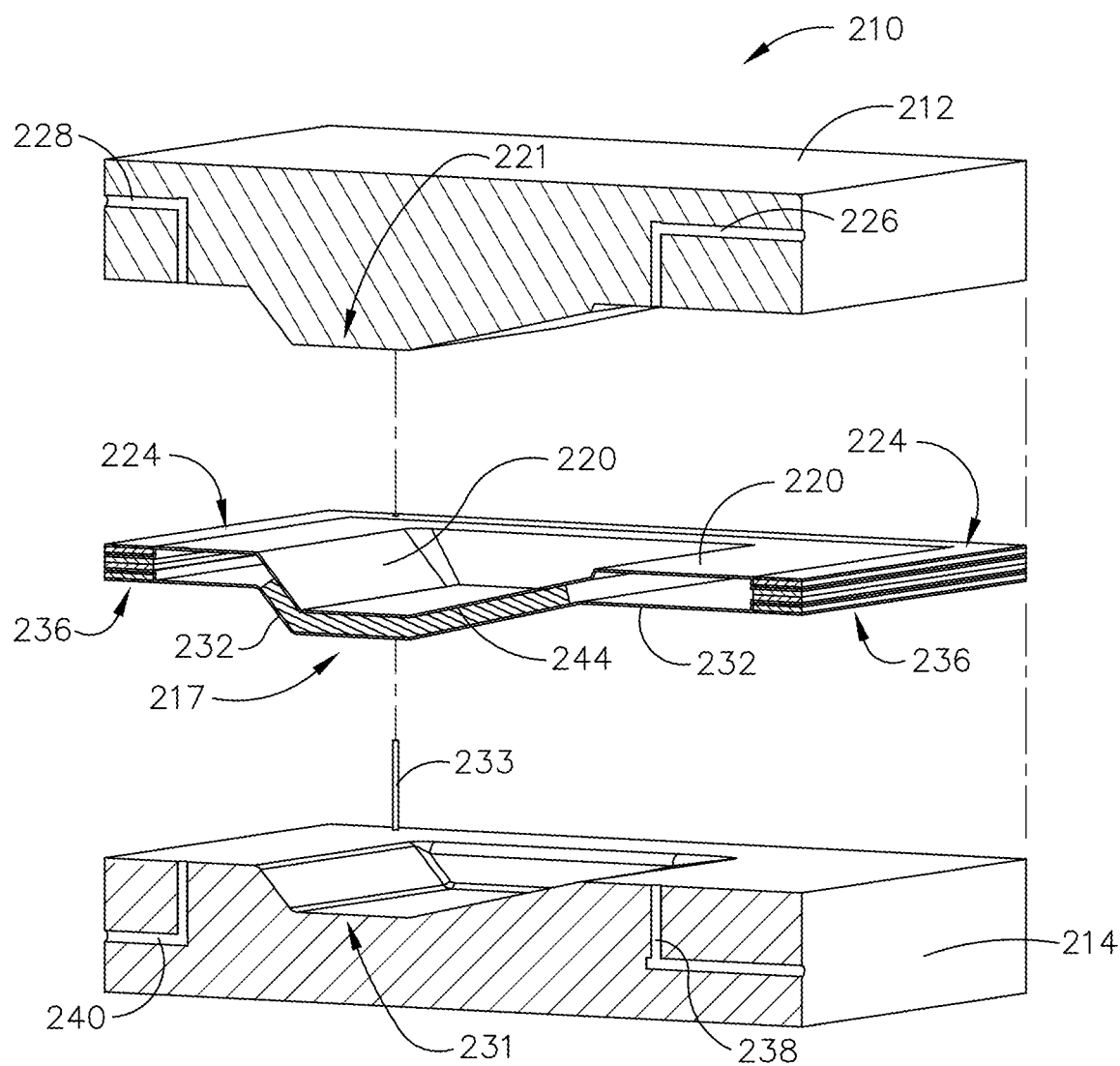
FIG. 14 is a perspective cross section view of FIG. 13 wherein the male and female die molds have been separated and the thermoplastic skin elements have been secured to opposing sides of the core panel element and the core panel element has been formed.
Figure 19:
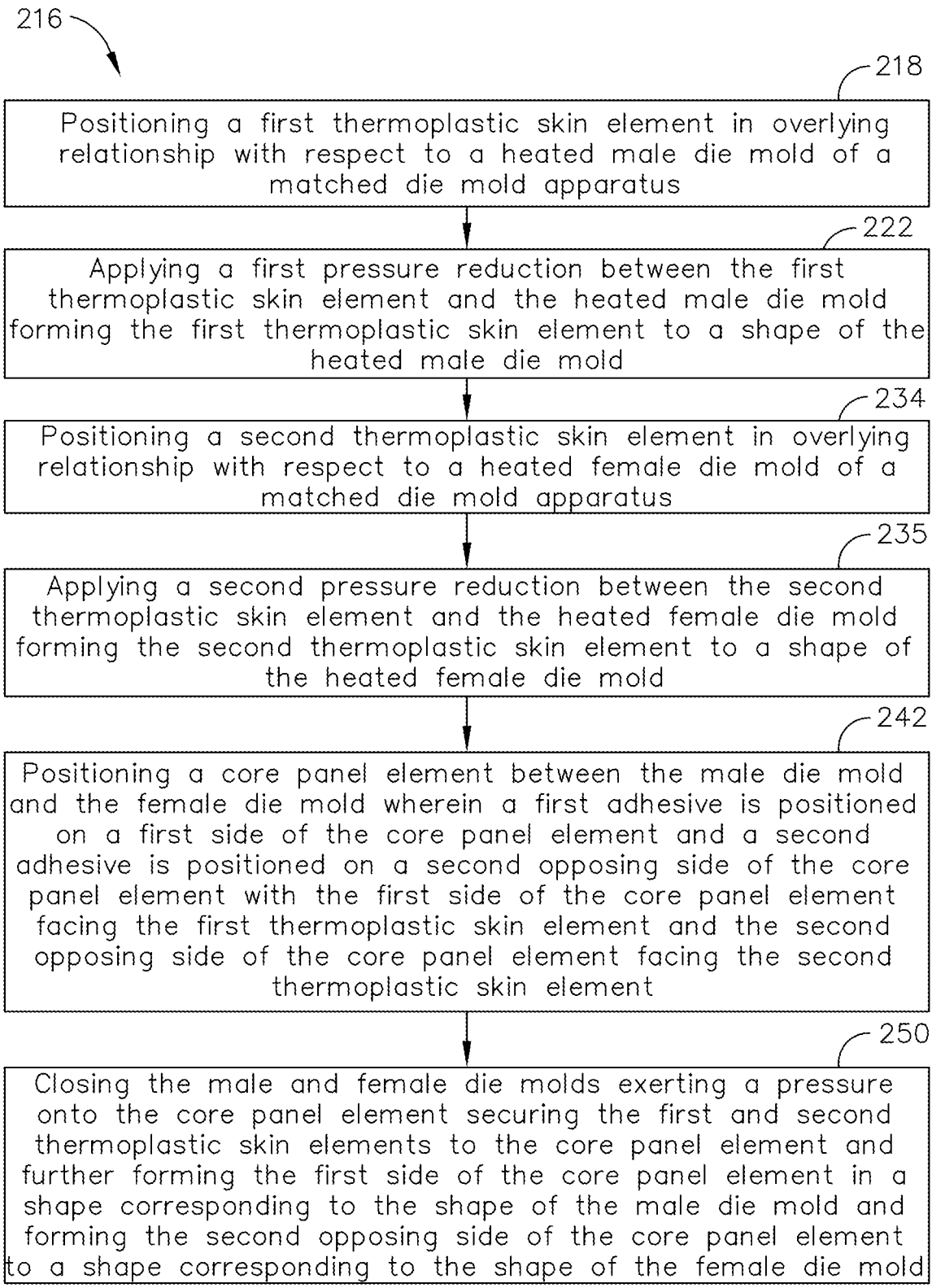
FIG. 19 is a flow chart for a method for making a structural sandwich panel.

In referring to FIG. 10, matched die mold apparatus 210 is shown which includes in this example male die mold 212 and female die mold 214. Matched die mold apparatus 210 is used in method 216, as set forth in FIG. 19, for making structural sandwich panel 217, as shown in FIG. 14. Method 216, as shown in FIG. 19, for making structural sandwich panel 217 includes step 218 of positioning first thermoplastic skin element 220 in overlying relationship with respect to heated male die mold 212 of matched die mold apparatus 210. Method 216 further includes step 222 of applying a first pressure reduction between first thermoplastic skin element 220 and heated male die mold 212 forming first thermoplastic skin element 220 to shape 221 of heated male die mold 212, as seen in FIG. 11.

First thermoplastic skin element skin element 220 is positioned within first frame assembly 224 to maintain thermoplastic skin element 220 in an unwrinkled condition. As will be discussed herein, thermoplastic skin element 220 has been removed from an oven where skin element 220 has been heated and is in a pliable condition. First frame assembly 224 is assembled, as earlier describe for first frame 20 and shown in FIG. 2 in this application, wherein first thermoplastic skin element 220 is positioned in place of film layer 28 and first frame assembly 224 is releasably clamped to male die mold 212, as similarly earlier shown and described for frame 20 in FIGS. 3 and 4. First thermoplastic skin element 220 is positioned within first frame assembly 224, prior to employing step 222 of applying first pressure reduction by way of, for example, vacuum ports 226, 228. Additional vacuum ports are employed with respect to male die mold 212 as needed. With carrying out step 222 of applying first pressure reduction between first thermoplastic skin element 220 and heated male die mold 212, first thermoplastic skin element 220 forms to shape 221 of heated male die mold 212.

In referring to FIG. 19 method 216 further includes step 234 of positioning second thermoplastic skin element 232 in overlying relationship with respect to heated female die mold 214 of matched die mold apparatus 210, as seen in FIG. 10. Method 216 further includes step 235 of applying a second pressure reduction between second thermoplastic skin element 232 and heated female die mold 214 forming second thermoplastic skin element 232 to shape 231 of heated female die mold 214, as seen in FIG. 11.

Second thermoplastic skin element skin element 232 is positioned within second frame assembly 236 to maintain second thermoplastic skin element 232 in an unwrinkled condition. As will be discussed herein, second thermoplastic skin element 232 has been removed from an oven where skin element 232 has been heated and is in a pliable condition. Second frame assembly 236 is assembled, as earlier described for second frame 24 and shown in FIG. 2 in this application wherein second thermoplastic skin element 232 is positioned in place of film layer 28. Second frame assembly 236 is releasably clamped to female die mold 214, as similarly earlier shown and described for second frame 24 in FIGS. 3 and 4, prior to employing step 235 of applying second pressure reduction by way of for example vacuum ports 238, 240. Additional vacuum ports are employed with respect to female die mold 212 as needed. With carrying out step 235 of applying second pressure reduction between second thermoplastic skin element 232 and heated female die mold 214, second thermoplastic skin element 232 forms to shape 231 of heated female die mold 214.

Figure 12:
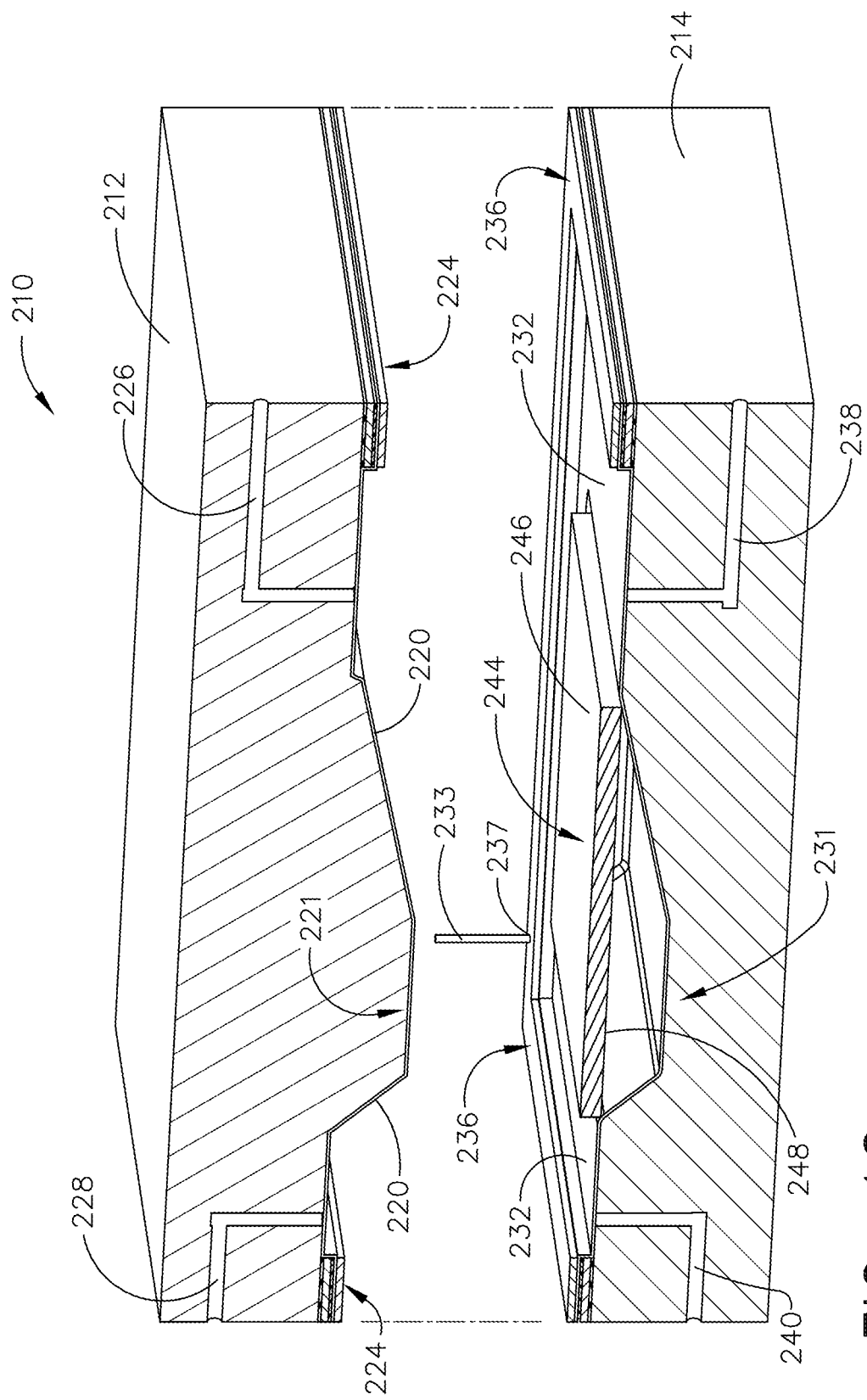
FIG. 12 is the perspective cross section view of FIG. 11 with male and female die molds in alignment with one another and a core panel element positioned on the female die mold.

Method 216 for making structural sandwich panel 217 of FIG. 19 further includes step 242 of positioning core panel element 244 between male die mold 212 and female die mold 214 as seen in FIG. 12. First adhesive (not shown) is positioned on first side 246 of core panel element 244 and second adhesive (not shown) is positioned on second opposing side 248 of core panel element 244. With core panel element 244 positioned, first side 246 of core panel element 244 faces first thermoplastic skin element 220 and second opposing side 248 of core panel element 244 faces second thermoplastic skin element 232.

Figure 13:
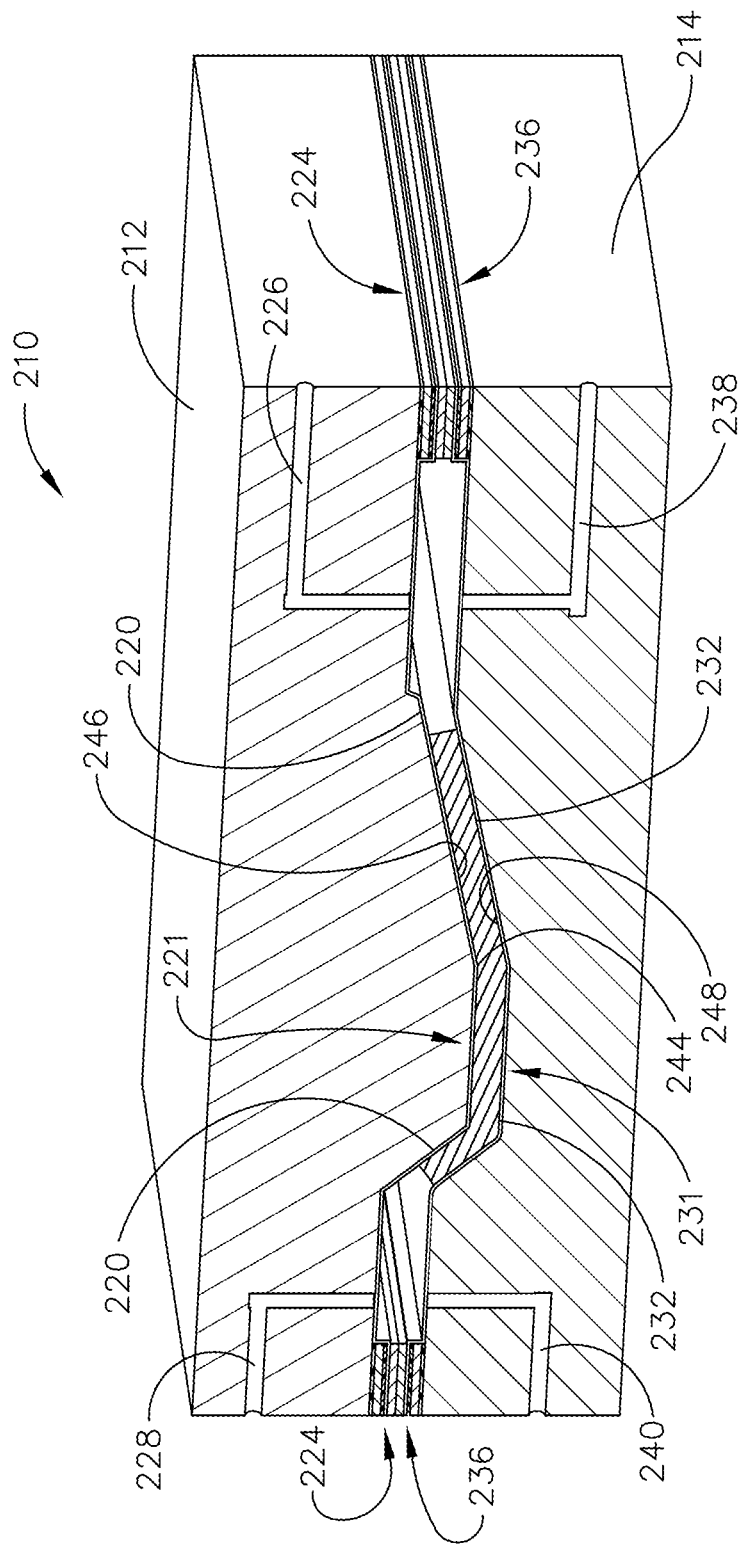
FIG. 13 is the perspective cross section view of FIG. 12 with the male and female die molds closed exerting pressure onto the core panel element securing the thermoplastic skin elements onto opposing sides of the core panel element and forming the core panel element.

In referring to FIGS. 13 and 19, method 216 further includes step 250 of closing the male and female die molds 212, 214 exerting a pressure onto core panel element 244 securing first and second thermoplastic skin elements 220, 232 to core panel element 244 and further forming first side 246 of core panel element 244 to a shape corresponding to shape 221 of heated male die mold 212 and forming second opposing side 248 of core panel element 244 to a shape corresponding to shape 231 of heated female die mold 214.

Alignment of male die mold, female die mold 214 and first and second frame assemblies 224 and 236 are maintained throughout operation of method 216 with utilization of pin 233 which in this example is secured to female die mold 214. Pin 233 in this example extends through opening 237, as seen in FIG. 12, of second frame assembly 236. With the closing of matched die mold apparatus 210, as seen in FIG. 13, pin 233 extends through opening 239 of first frame assembly 224 as seen in FIG. 11 and through an opening (not shown) which is positioned in male die mold 212 in alignment with opening 239. Additional pins and arrangement of openings can be employed as mentioned above so as to maintain matched die mold apparatus 210 and first and second frame assemblies 224 and 236 in alignment.

Method 216 of making structural sandwich panel 217 further includes step 250, as seen in FIG. 13, of male and female die molds 212, 214 exerting pressure onto core panel element 244 securing first and second thermoplastic skin elements 220, 232 to core panel element 244. The pressure further forms first side 246 of core panel element to a shape corresponding to shape 231 of heated male die mold 212 and forming second opposing side 248 of core panel element 244 to a shape corresponding to shape 231 of heated female die mold 214.

Once the compression cycle of matched die mold 210 is completed, as seen in FIG. 14, male and female die molds 212, 214 are separated. First and second frame assemblies 224 and 236 are removed from matched die mold apparatus 210. Excess first and second thermoplastic skin elements 220 and 232 are cut or routed about a perimeter of core panel element 244 resulting in a more finished structural sandwich panel 217. Structural sandwich panel 217 with outer skins constructed of first and second thermoplastic skin elements 220 and 236 have surfaces that do not require extensive processing as did skins of structural panels, formed within an apparatus, that were constructed of a prepreg composite.

Decorative enhancement of structural sandwich panel 217 can be obtained easily during the fabrication process of method 216 in making structural sandwich panel 217. In one example, decorative enhancement would include utilization of at least one of first and second thermoplastic skin elements 220, 232 having a color introduced within the construction phase of the at least one of first and second thermoplastic skin element 220, 232 prior to employment of method 216.

Another example of decorative enhancement would include providing a textured surface on at least one of male and female die mold 212, 214 such that the texture can be imparted to at least one of first and second thermoplastic skin elements 220, 236 during the employment of method 216 of making structural sandwich panel 217. The thermal compression will impart the textured configuration carried by at least of the male and female die molds 212, 214.

Another example of decorative enhancement of structural sandwich panel 217 would include employment of at least one step of positioning one of a gel or coating onto heated male die mold 212, prior to the step 218 of positioning first thermoplastic skin element 220 in overlying relationship with respect to heated male die mold 212, or onto heated female die mold 214, prior to step 230 of positioning second thermoplastic skin element 232 in overlying relationship with respect to heated female die mold 214.

Another example of providing decorative enhancement to structural sandwich panel 217 would include to position structural sandwich panel 217 into a matched die mold such as match die mold apparatus 10, as earlier discussed, after structural sandwich panel 217 has been constructed and after decorative film has been formed onto one or both of male and female die molds and utilize thermal compression with match die mold and apply decorative film onto one or both of first and second thermoplastic skin element 220, 232. An additional method of decorative enhancement of structural sandwich panel 217 will be discussed below utilizing the application of decorative film within method 216 for making structural sandwich panel 217 and shown in FIGS. 15-18.

With respect to method 216, step 218 of positioning the first thermoplastic skin element 220 includes positioning first thermoplastic skin element 220 constructed of at least one layer of material having a homogeneous construction of a resin. The resin includes one resin from a wide variety of thermoplastic resins such as polyphenylsulfone, polyetherimide, polycarbonate, polyether ether ketone, acrylonitrile butadiene styrene, polyetherketoneketone or acrylic-polyvinyl chloride. Step 218 can also include positioning first thermoplastic skin element 220 being constructed of at least one layer of material which includes a fiber reinforced resin. The resin of this reinforced resin can include one resin from a variety of thermoplastic resins such as for example one of polyphenylsulfone, polyetherimide, polycarbonate, polyether ether ketone, acrylonitrile butadiene styrene, polyetherketoneketone or acrylic-polyvinyl chloride. The fibers are constructed of one from a variety of materials such as ones constructed of one of fiberglass or carbon. In constructing first thermoplastic skin element 220, prior to implementation of method 216, such construction includes in the present example of one layer up to three layers of material and in other examples of first thermoplastic skin element 220 an excess of three layers is employed as needed.

Step 218 of method 216 for making sandwich panel 217 further includes heating the first thermoplastic skin element to a temperature in a range which includes five hundred degrees Fahrenheit (500° F.) up to and including seven hundred degrees Fahrenheit (700° F.). The heating is accomplished in one of a variety of ways such as by way of an infrared oven, with use of lamps, with use of a convection process or other common heating methodologies. The heating methodology employed for first thermostatic skin element 220 can also be used for heating the second thermoplastic skin element 232 as will be mentioned below. The heating of first thermoplastic skin element 220 makes skin element 220 pliable and first frame assembly 224 provides for first thermoplastic skin element 220 to be positioned within matched die mold apparatus 210 without wrinkles for carrying out method 216. With first thermoplastic skin element 220 pliable and secured within first frame assembly 224 and first frame assembly secured to male die mold 212, implementation of step 222 of applying first pressure reduction between male die mold 212 and first thermoplastic skin element 220 is carried out and the first pressure reduction draws first thermoplastic skin element 220 and forms first thermoplastic skin element 220 to shape 221 of heated male die mold 212.

With respect to method 216, step 234 of positioning the second thermoplastic skin element 232 includes positioning second thermoplastic skin element 232 constructed of at least one layer of material of a homogeneous construction of a resin. The resin includes one resin from a wide variety of thermoplastic resins such as polyphenylsulfone, polyetherimide, polycarbonate, polyether ether ketone, acrylonitrile butadiene styrene, polyetherketoneketone or acrylic-polyvinyl chloride. Step 234 can also include positioning second thermoplastic skin element 232 being constructed of at least one layer of material which includes a fiber reinforced resin. The resin of this reinforced resin can include one resin from a variety of thermoplastic resins such as for example one of polyphenylsulfone, polyetherimide, polycarbonate, polyether ether ketone, acrylonitrile butadiene styrene, polyetherketoneketone or acrylic-polyvinyl chloride. The fibers are constructed of one of variety of fibers such as ones constructed of one of fiberglass or carbon. In constructing second thermoplastic skin element 232, such construction can include in the present example of one layer up to three layers of material and in other examples of first thermoplastic skin element 220 an excess of three layers is employed as needed.

Step 234 of method 216 for making sandwich panel 217 further includes heating the second thermoplastic skin element 232 to a temperature in a range which includes five hundred degrees Fahrenheit (500° F.) up to and including seven hundred degrees Fahrenheit (700° F.). The heating of second thermoplastic skin element 232 makes skin element 232 pliable and second frame assembly 236 provides for skin element 232 to be positioned within matched die mold apparatus 210 without wrinkles for carrying out method 216. With second thermoplastic skin element 232 pliable and secured within second frame assembly 236 and second frame assembly 236 secured to female die mold 214, implementation of step 235 of applying second pressure reduction between female die mold 214 and second thermoplastic skin element 232 is carried out and second pressure reduction draws second thermoplastic skin element 232 and forms second thermoplastic skin element 232 to shape 231 of heated female die mold 214.

Step 242 of positioning core panel element 244 includes the step of positioning core panel element 244 being constructed of one of aluminum or thermoplastic such as, polypropylene, polycarbonate, polyethylene or fiber reinforced aramid core with thermoset phenolic resin. The construction of core panel element 244 can include one of a variety of open cell shapes such as a honeycomb construction. Step 242 of positioning core panel element 244 includes a step of positioning core panel element 244 having a foam construction of one of an open or closed cell and one of polyethelene teraphalate, polyphenylsulfone, polyetherimide of polyvinyl chloride. In addition, step 242 of positioning core panel element 244 includes positioning core panel element 244 with a first adhesive positioned on first side 246 and a second adhesive positioned on second opposing side 248 wherein the first adhesive and second adhesive is one of a film or a liquid adhesive. The liquid adhesive can be applied by one of a number of known ways of application such as by spraying, rolling, brushing etc. The selection of the film or liquid adhesive to be used is to be compatible for bonding the particular material of core panel element 244 to the particular thermoplastic material of the first and second thermoplastic skin elements 220, 232.

Method 216 for making structural sandwich panel 217 further includes a step of heating male and female die molds 212, 214 prior to implementation of method 216 to a temperature in a temperature range which includes two hundred and eighty degrees Fahrenheit (280° F.) up to and including three hundred and twenty degrees Fahrenheit (320° F.). Male and female die molds 212, 214 are heated by one of a variety of methodologies such as by way of circulating a heated medium such as water, oil or steam through openings provided by die molds 212, 214 or by way of utilizing electrical current being passed through die molds 212, 214. Other heating methodologies can be employed as needed. Step 222 of applying first pressure reduction between first thermoplastic skin element 220 and heated male die mold 212 and step 235 of applying second pressure reduction between second thermoplastic skin element 232 and heated female die mold 214 each has a first time duration in a range which includes thirty (30) seconds up to and including sixty (60) seconds.

Step 250 of closing male and female die molds 212, 214 includes male and female die molds 212, 214 exerting a pressure in a range which includes fourteen pounds per square inch (14 psi) up to and including one hundred pounds per square inch (100 psi). The time duration for exerting this pressure includes a second time duration of thirty (30) seconds up to and including sixty (60) seconds.

Figure 15:
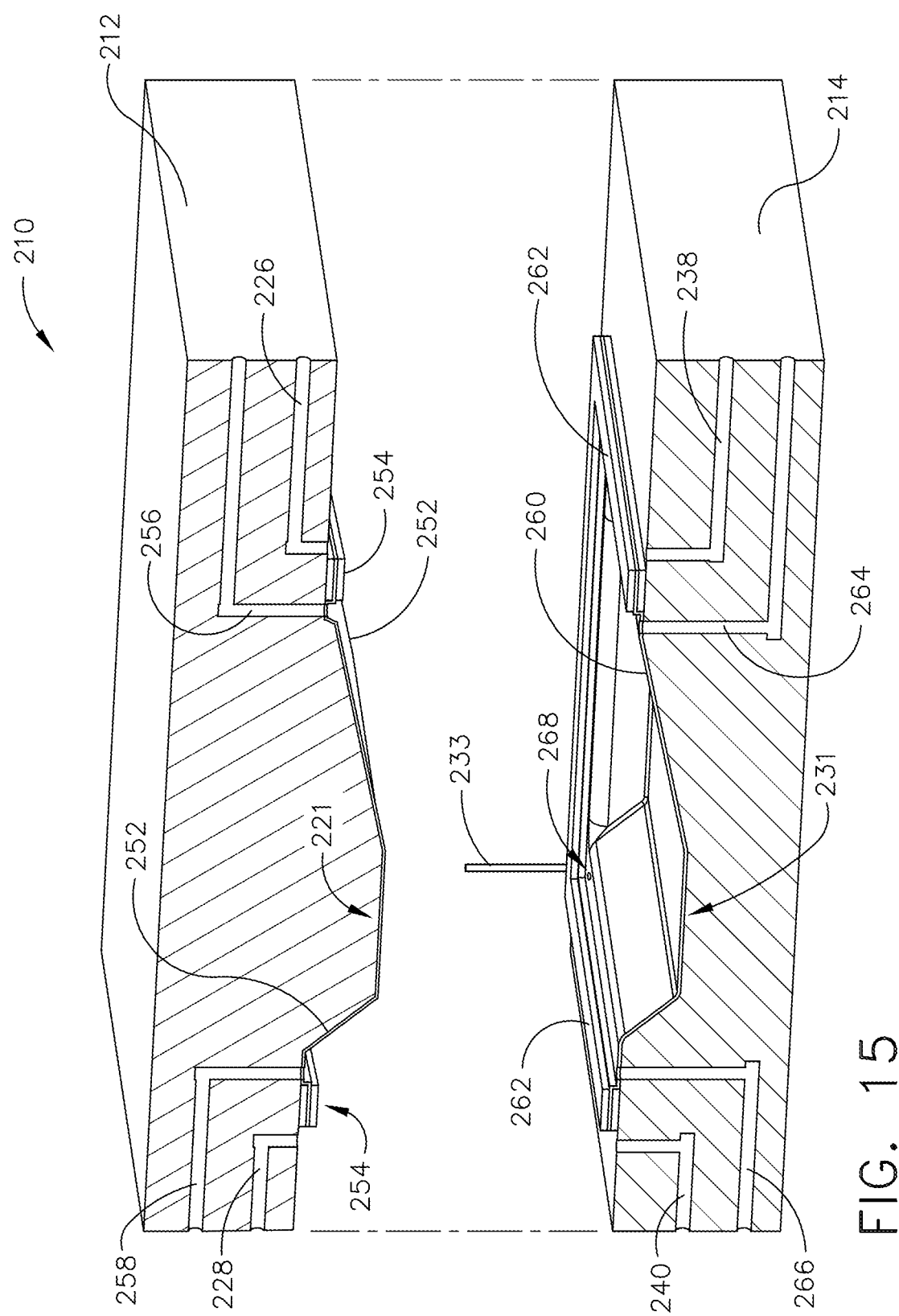
FIG. 15 is a perspective cross section view of a matched die mold apparatus wherein an application of a reduction of pressure has been applied between the male die mold and a decorative layer and an application of a reduction of pressure has been applied between of the female die mold and another decorative layer.

In referring to FIGS. 15-18, prior to step 218 of positioning first thermoplastic skin element 220 in an overlying relationship with respect to heated male die mold 212 a step, as seen in FIG. 15, of positioning first decorative layer 252 in overlying relationship with respect to heated male die mold 212 is shown. First decorative layer 252 is constructed of one of a variety of materials including for example polyvinyl fluoride. As seen in FIG. 15, step of applying third pressure reduction is applied between first decorative layer 252 and heated male die mold 212 which forms first decorative layer 252 to shape 221 of heated male die mold 212 is shown. First decorative layer 252 is secured to third frame assembly 254 wherein third frame assembly 254 is constructed similarly to first frame assembly 224 described earlier and is similarly releasably clamped to male die mold 212. Applying third pressure reduction is applied through vacuum ports 256, 258 between heated male die mold 212 and first decorative layer 252 forming first decorative layer 252 to shape 221 of heated male die mold 212.

Similarly, as seen in FIG. 15, second decorative layer 260 is positioned in overlying relationship with respect to heated female die mold 214. Second decorative layer 260 is constructed of one of a variety of materials as first decorative layer 252. As seen in FIG. 15, step of applying fourth pressure reduction is applied between second decorative layer 260 and heated female die mold 214 which then forms second decorative layer 260 to shape 231 of heated female die mold 214 as shown. Second decorative layer 260 is secured to fourth frame assembly 262 wherein fourth frame assembly 262 is also constructed similarly to first frame assembly 224 described earlier and is similarly releasably clamped to heated female die mold 214. Applying fourth pressure reduction is applied through vacuum ports 264, 266 between heated female die mold 214 and second decorative layer 260 forming second decorative layer 260 to shape 231 of heated female die mold 214.

Figure 16:
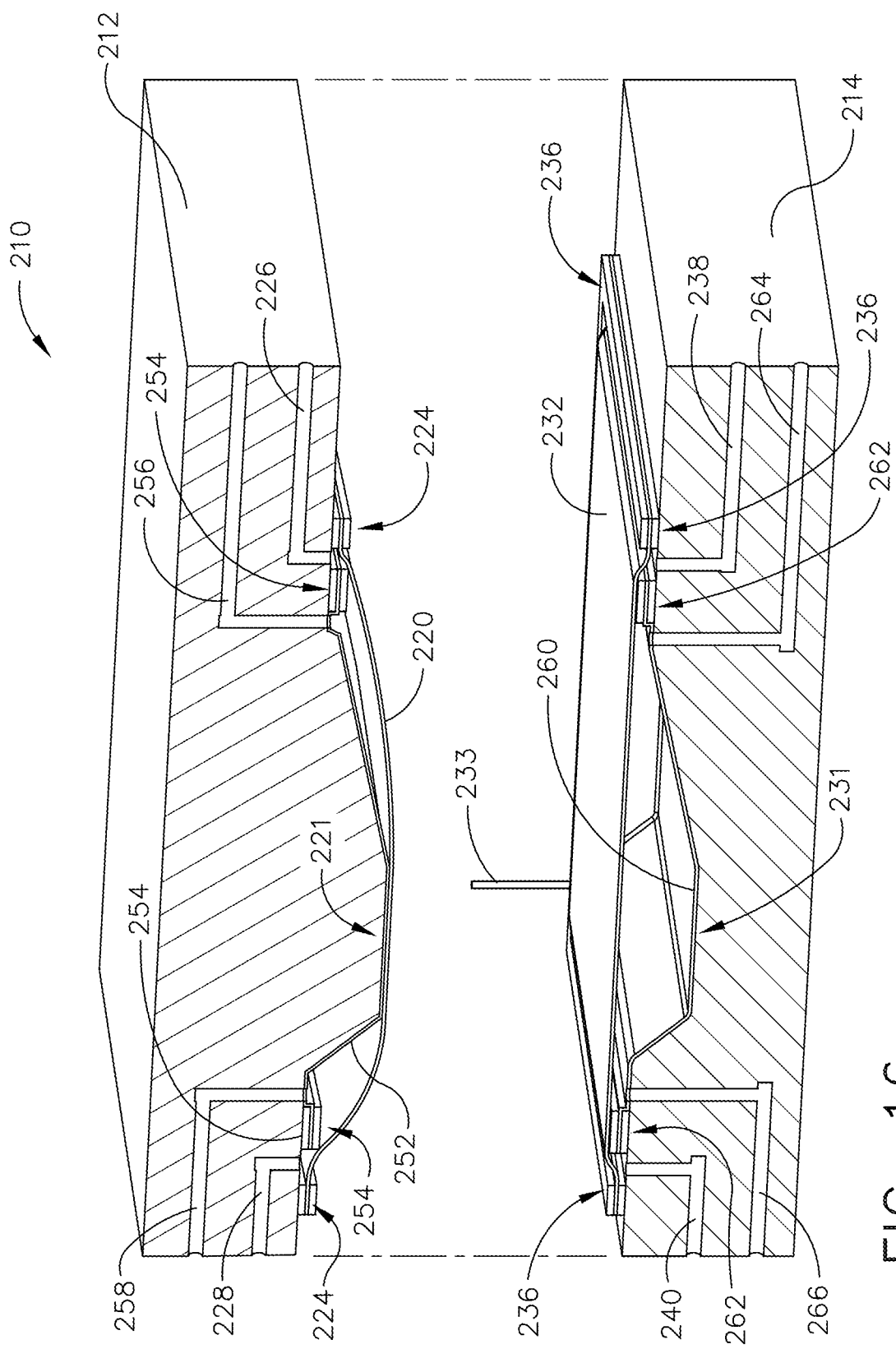
FIG. 16 is the perspective cross section view of the matched die mold apparatus of FIG. 16 with a thermoplastic skin element positioned in overlying relationship with respect to each of the male die mold and the female die mold.

In referring to FIG. 16, as described earlier, step 218 is employed with first thermoplastic skin element 220 being positioned in overlying relationship with respect to male die mold 212. First thermoplastic skin element 220 is secured into first frame assembly 224 as described earlier and clamped to male die mold 212. Step 234 is employed of positioning second thermoplastic skin element 232 in overlying relationship with respect to female die mold 214. Second thermoplastic skin element 232 is secured into second frame assembly 236 as described earlier and clamped to female die mold 214.

With applying fourth pressure reduction between second decorative layer 260 and heated female die mold 214, second decorative layer 260 is formed to a shape corresponding to shape 231 of heated female die mold 214. A step of positioning second aperture 268 into second decorative layer 260 is made and is in this example aligned with a vacuum port (not shown). Additional such apertures aligned with vacuum ports can be positioned through second decorative layer 260 as needed to provide additional pressure reduction with respect to forming second thermoplastic skin element 232 to heated female die mold 214 with second decorative layer 260 positioned between heated female die mold 214 and second thermoplastic skin element 232. The additional apertures can provide a more well distributed reduction of pressure across second thermoplastic skin element 232. In this example, with second thermoplastic skin element 232 positioned in an overlying relationship with respect to female die mold 214 and secured to heated female die mold 214, step 235 of applying second reduction of pressure is applied through aperture 268, as well as, through vacuum ports 238, 240, between second thermoplastic skin element 232 and heated female die mold 214, with second decorative layer 260 positioned between heated female die mold 214 and second thermoplastic skin element 232. Second thermoplastic skin element 232 forms a shape corresponding to shape 231 of heated female die mold 214 as seen in FIG. 17.

With applying third pressure reduction between first decorative layer 252 and heated male die mold 212, first decorative layer 252 is formed to a shape corresponding to shape 221 of heated male die mold 212. A step of positioning a first aperture (not shown, however similar to aperture 268 positioned in second decorative layer 260) into first decorative layer 252 is made and is in this example aligned with a vacuum port (not shown). Additional such apertures aligned with vacuum ports can be positioned through first decorative layer 252 as needed to provide additional pressure reduction with respect to forming first thermoplastic skin element 220 to heated male die mold 212 with first decorative layer 252 positioned between heated male die mold 212 and first thermoplastic skin element 220. The additional apertures can provide a more well distributed reduction of pressure across first thermoplastic skin element 220. In this example, with first thermoplastic skin element 220 positioned in an overlying relationship with respect to male die mold 212 and secured to heated male die mold 212, step 222 of applying first reduction of pressure through the aperture (not shown), as well as, vacuum ports 226, 228, between first thermoplastic skin element 220 and heated male die mold 212, with first decorative layer 252 positioned between heated male die mold 212 and first thermoplastic skin element 220. First thermoplastic skin element 220 forms to a shape corresponding to shape 221 of heated male die mold 212, as seen in FIG. 17.

Figure 17:
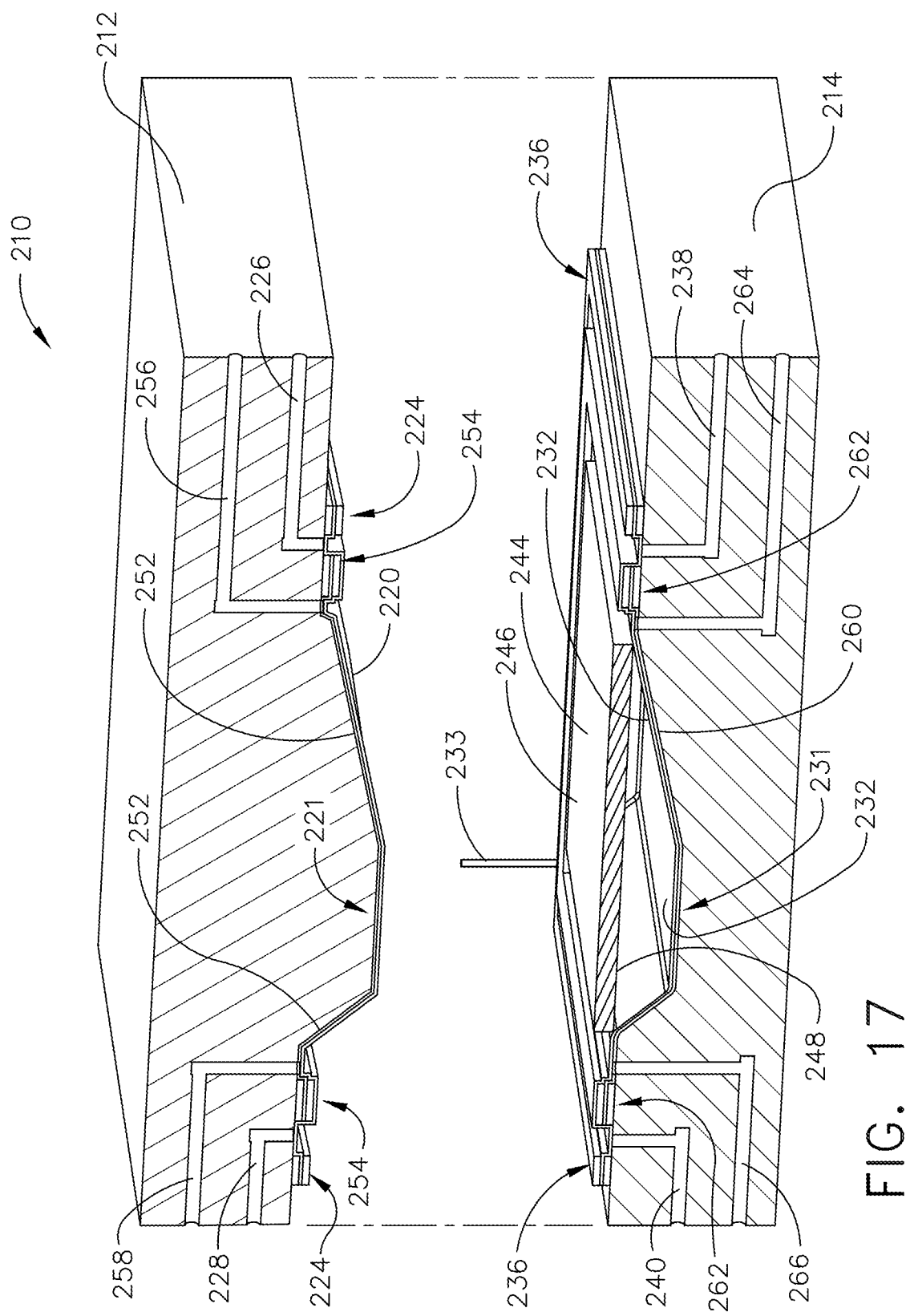
FIG. 17 is the perspective cross section view of the matched die mold apparatus of FIG. 16 with a core panel element positioned in overlying relationship to the female die mold.
Figure 18:
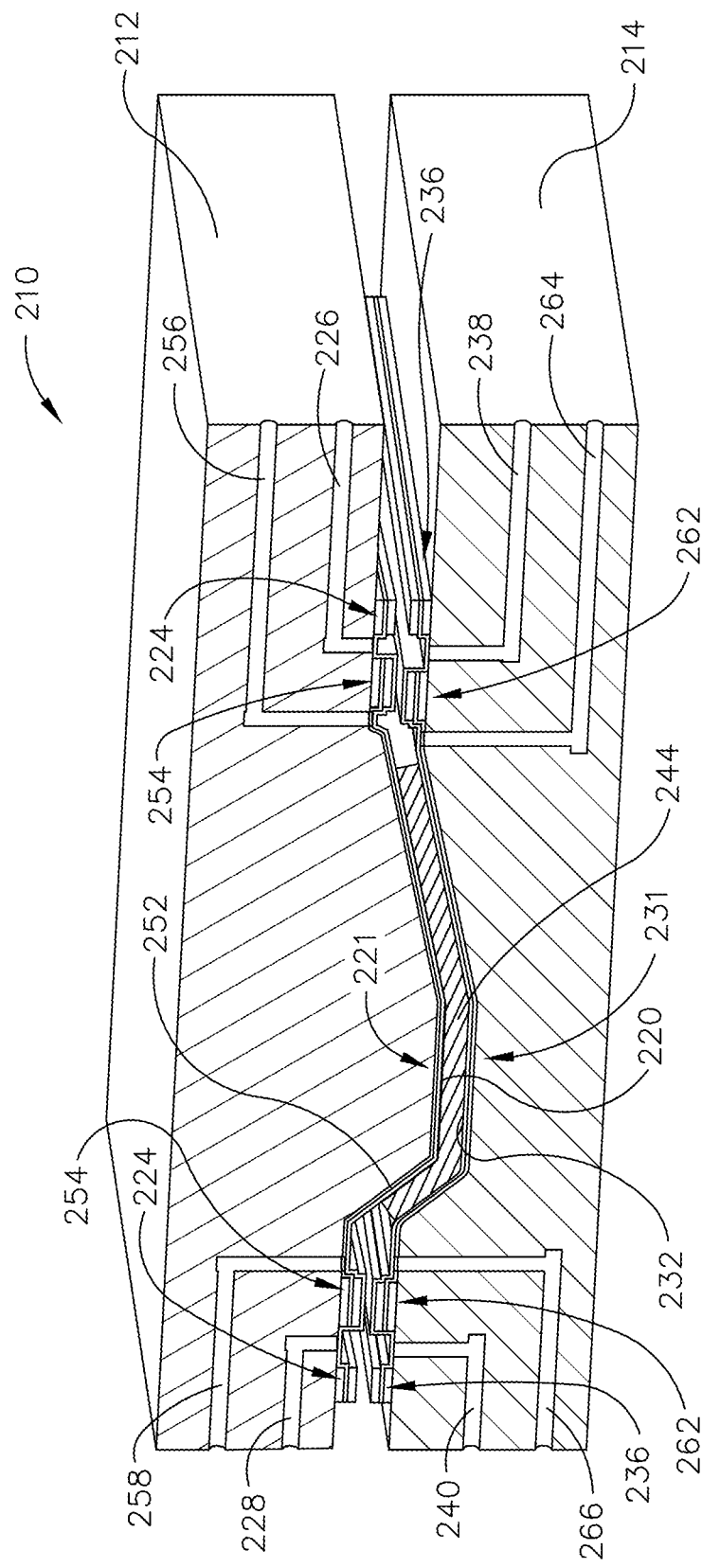
FIG. 18 the male and female die molds of FIG. 17 are closed exerting pressure onto the core panel element securing the decorative sheets to the thermoplastic skin elements, securing the thermoplastic skin elements to the core panel element and forming the core panel.

With first decorative layer 252 and first thermoplastic skin element 220 positioned in overlying relationship with respect to heated male die mold 212 and second decorative layer 260 and second thermoplastic skin element 232 positioned in overlying relationship with respect to heated female die mold 214, as seen in FIG. 17, step 242 is implemented positioning core panel element 244 between heated male and female die molds 212, 214. As described earlier, a first adhesive (not shown) is positioned on first side 246 and a second adhesive is positioned on second side 248 of core panel element 244. Step 250 is implemented, as seen in FIG. 18, closing heated male and female die molds 212, 214 which exert a pressure onto core panel element 244 securing first and second thermoplastic skin elements 220, 232 to core panel element 244 and further forming first side 246 of core panel element 244 to a shape corresponding to shape 221 of heated male die mold 212 and forming second opposing side 248 of core panel mold 244 to a shape corresponding to shape 231 of heated female die mold 214. First decorative layer 252 is bonded to first thermoplastic skin element 220 and second decorative layer 260 is bonded to second thermoplastic skin element 232. This process can be applied such that one side of core panel element 244 is decorated and the other side is not decorated. As a result, structural sandwich panel 217 is made utilizing a matched die mold apparatus 210 and provides as desired, at least one decorative side to structural sandwich panel 217 with ensured high quality, quickly, reliably and at less cost.

While various embodiments have been described above, this disclosure is not intended to be limited thereto. Variations can be made to the disclosed embodiments that are still within the scope of the appended claims.

What is claimed:

1. A method for making a structural sandwich panel, comprising the steps of:
    positioning a first thermoplastic skin element in overlying relationship with respect to a heated male die mold of a matched die mold apparatus;
    applying a first pressure reduction between the first thermoplastic skin element and the heated male die mold forming the first thermoplastic skin element to a shape of the heated male die mold;
    positioning a second thermoplastic skin element in overlying relationship with respect to a heated female die mold of the matched die mold apparatus;
    applying a second pressure reduction between the second thermoplastic skin element and the heated female die mold forming the second thermoplastic skin element to a shape of the heated female die mold;
    positioning a core panel element between the heated male die mold and the heated female die mold wherein a first adhesive is positioned on a first side of the core panel element and a second adhesive is positioned on a second opposing side of the core panel element with the first side of the core panel element facing the first thermoplastic skin element and the second opposing side of the core panel element facing the second thermoplastic skin element; and
    closing the heated male and female die molds exerting a pressure onto the core panel element securing the first and second thermoplastic skin elements to the core panel element and further forming the first side of the core panel element to a shape corresponding to the shape of the heated male die mold and forming the second opposing side of the core panel element to a shape corresponding to the shape of the heated female die mold.

2. The method for making the structural sandwich panel of claim 1, wherein the step of positioning the first thermoplastic skin element further includes securing the first thermoplastic skin element in a first frame assembly.

3. The method for making the structural sandwich panel of claim 1, wherein the step of positioning the first thermoplastic skin element includes positioning the first thermoplastic skin element comprising at least one layer of material of a homogeneous construction comprising a resin of one of polyphenylsulfone, polyetherimide, polycarbonate, polyether ether ketone, acrylonitrile butadiene styrene, polyetherketoneketone or acrylic-polyvinyl chloride.

4. The method for making the structural sandwich panel of claim 1, wherein the step of positioning the first thermoplastic skin element includes positioning the first thermoplastic skin element comprising at least one layer of material comprising a fiber reinforced resin wherein:
    the resin comprises one of polyphenylsulfone, polyetherimide, polycarbonate, polyether ether ketone, acrylonitrile butadiene styrene, polyetherketoneketone or acrylic-polyvinyl chloride and
    the fiber comprises one of fiberglass or carbon.

5. The method for making the structural sandwich panel of claim 1, wherein the first thermoplastic skin element comprises construction of one to three layers.

6. The method for making the structural sandwich panel of claim 1, wherein the step of positioning the first thermoplastic skin element further includes heating the first thermoplastic skin element to a temperature in a range which includes five hundred degrees Fahrenheit (500° F.) up to and including seven hundred degrees Fahrenheit (700° F.).

7. The method for making the structural sandwich panel of claim 1, wherein the step of positioning the second thermoplastic skin element further includes securing the second thermoplastic skin in a second frame assembly.

8. The method for making the structural sandwich panel of claim 1, the step of positioning the second thermoplastic skin element includes positioning the second thermoplastic skin element comprising at least one layer of material of a homogeneous construction comprising a resin of one of polyphenylsulfone, polyetherimide, polycarbonate, polyether ether ketone, acrylonitrile butadiene styrene, polyetherketoneketone or acrylic-polyvinyl chloride.

9. The method for making the structural sandwich panel of claim 1, wherein the step of positioning the second thermoplastic skin element includes:
    positioning the second thermoplastic skin element comprising at least one layer of material comprising a fiber reinforced resin wherein:
        the resin comprises one of polyphenylsulfone, polyetherimide, polycarbonate, polyether ether ketone, acrylonitrile butadiene styrene, polyetherketoneketone or acrylic-polyvinyl chloride and
        the fiber comprises one of fiberglass or carbon.

10. The method for making the structural sandwich panel of claim 1, wherein the second thermoplastic skin element comprises a construction of one layer up three layers.

11. The method for making the structural sandwich panel of claim 1, wherein the step of positioning the second thermoplastic skin element further includes heating the second thermoplastic skin element to a temperature in a range which includes five hundred degrees Fahrenheit (500° F.) up to and including seven hundred degrees Fahrenheit (700° F.).

12. The method for making a structural sandwich panel of claim 1, wherein the step of positioning the core panel element includes the step of positioning the core panel element constructed of one of aluminum, polypropylene, polycarbonate, polyethylene or fiber reinforced aramid core with thermoset phenolic resin.

13. The method for making the structural sandwich panel of claim 1, wherein the step of positioning the core panel element includes the step of positioning the core panel element having a foam construction of one of an open or closed cell and one of polyethelene teraphalate, polyphenylsulfone, polyetherimide of polyvinyl chloride.

14. The method for making the structural sandwich panel of claim 1, wherein the step of positioning the core panel element includes the step of positioning the core panel element with a first and second adhesive comprising one of a film or a liquid adhesive.

15. The method for making the structural sandwich panel of claim 1, further includes a step of heating a male and female die molds to a temperature in a temperature range which includes two hundred and eighty degrees Fahrenheit (280° F.) up to and including three hundred and twenty degrees Fahrenheit (320° F.) resulting in the heated male die mold and the heated female die mold.

16. The method for making the structural sandwich panel of claim 1, wherein the step of closing the heated male and female die molds includes the heated male and female die molds exerting a pressure in a range which includes fourteen pounds per square inch (14 psi) up to and including one hundred pounds per square inch (100 psi).

17. The method for making the structural sandwich panel of claim 1, wherein:
the step of applying a first pressure reduction between the first thermoplastic skin element and the heated male die mold and the step of applying a second pressure reduction between the second thermoplastic skin element and the heated female die mold each has a first time duration in a range which includes thirty (30) seconds up to and including sixty (60) seconds; and
the step of closing the heated male and female die molds and exerting a pressure onto the core panel element has a second time duration in a range which includes thirty (30) seconds up to and including sixty (60) seconds.

18. The method for making the structural sandwich panel of claim 1, further including at least one step of:
positioning one of a gel or coating onto the heated male die mold prior to the step of positioning the first thermoplastic skin element overlying the heated male die mold; or
positioning one of a gel or coating onto the heated female die prior to the step of positioning the second thermoplastic skin element overlying the heated female die mold.

19. The method for making the structural sandwich panel of claim 1, prior to the step of positioning the first thermoplastic skin element in an overlying relationship with respect to the heated male die mold, further including:
a step of positioning a first decorative layer in an overlying relationship with respect to the heated male die mold;
a step of applying a third pressure reduction between the first decorative layer and the heated male die mold forming first decorative layer to the heated male die mold; and
positioning a first aperture in the first decorative layer.

20. The method for making the structural sandwich panel of claim 19, prior to the step of positioning the second thermoplastic skin element in an overlying relationship with respect the heated female die mold, further including:
a step of positioning a second decorative layer in overlying relationship with respect to the heated female die mold;
a step of applying a fourth pressure reduction between the second decorative layer and the heated female die mold forming second decorative layer to the heated female die mold; and
positioning a second aperture in the second decorative layer.

* * * * *